(12) United States Patent
Shirai et al.

(10) Patent No.: US 8,061,846 B2
(45) Date of Patent: Nov. 22, 2011

(54) LIGHT SOURCE CONTROL METHOD FOR VIDEO IMAGE DISPLAY APPARATUS AND VIDEO IMAGE DISPLAY APPARATUS

(75) Inventors: Akira Shirai, Hino (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 389 days.

(21) Appl. No.: 12/315,465

(22) Filed: Dec. 3, 2008

(65) Prior Publication Data
US 2009/0141189 A1 Jun. 4, 2009

Related U.S. Application Data

(60) Provisional application No. 61/005,286, filed on Dec. 4, 2007.

(51) Int. Cl.
*G03B 21/14* (2006.01)
(52) U.S. Cl. ............... 353/31; 353/85; 353/94; 348/743
(58) Field of Classification Search ............. 353/84, 353/85, 31, 94; 348/742, 743, 771; 349/5–9
See application file for complete search history.

(56) References Cited

U.S. PATENT DOCUMENTS

| | | | |
|---|---|---|---|
| 5,365,283 A | 11/1994 | Doherty et al. | |
| 5,528,317 A | 6/1996 | Gove et al. | |
| 5,625,424 A | 4/1997 | Conner et al. | |
| 5,657,099 A | 8/1997 | Doherty et al. | |
| 5,691,780 A | 11/1997 | Marshall et al. | |
| 5,863,125 A | 1/1999 | Doany et al. | |
| 5,921,650 A | 7/1999 | Doany et al. | |
| 6,002,452 A | 12/1999 | Morgan | |
| 6,327,093 B1 | 12/2001 | Nakanishi et al. | |
| 6,379,011 B1* | 4/2002 | Knox | 353/31 |
| 6,738,104 B2 | 5/2004 | Marshall | |
| 6,750,874 B1 | 6/2004 | Kim | |
| 6,814,450 B2* | 11/2004 | Kim | 353/94 |
| 6,911,963 B2 | 6/2005 | Baba et al. | |
| 6,962,414 B2 | 11/2005 | Roth | |
| 7,077,524 B2 | 7/2006 | Roth | |
| 7,118,221 B2* | 10/2006 | Shimada | 353/31 |
| 7,118,225 B2* | 10/2006 | Penn | 353/84 |
| 7,233,427 B2 | 6/2007 | Doherty et al. | |
| 7,287,858 B2* | 10/2007 | Kim et al. | 353/20 |
| 7,339,631 B2 | 3/2008 | Ahn | |
| 7,405,856 B2 | 7/2008 | Doherty et al. | |
| 2009/0141188 A1* | 6/2009 | Shirai et al. | 348/743 |
| 2009/0141194 A1* | 6/2009 | Shirai et al. | 348/756 |
| 2009/0141195 A1* | 6/2009 | Shirai et al. | 348/760 |

* cited by examiner

*Primary Examiner* — William C Dowling
(74) *Attorney, Agent, or Firm* — Bo-In Lin

(57) ABSTRACT

A method for controlling a light source of a video image display apparatus, comprising: projecting illumination lights to a first spatial light modulator (SLM) and a second SLM, and changing over a wavelength of one of the illumination lights projected to the second SLM in a sequence during a period when the wavelength of another one of the illumination lights projected to the first SLM is controlled to have a flexibly adjustable wavelength.

21 Claims, 27 Drawing Sheets

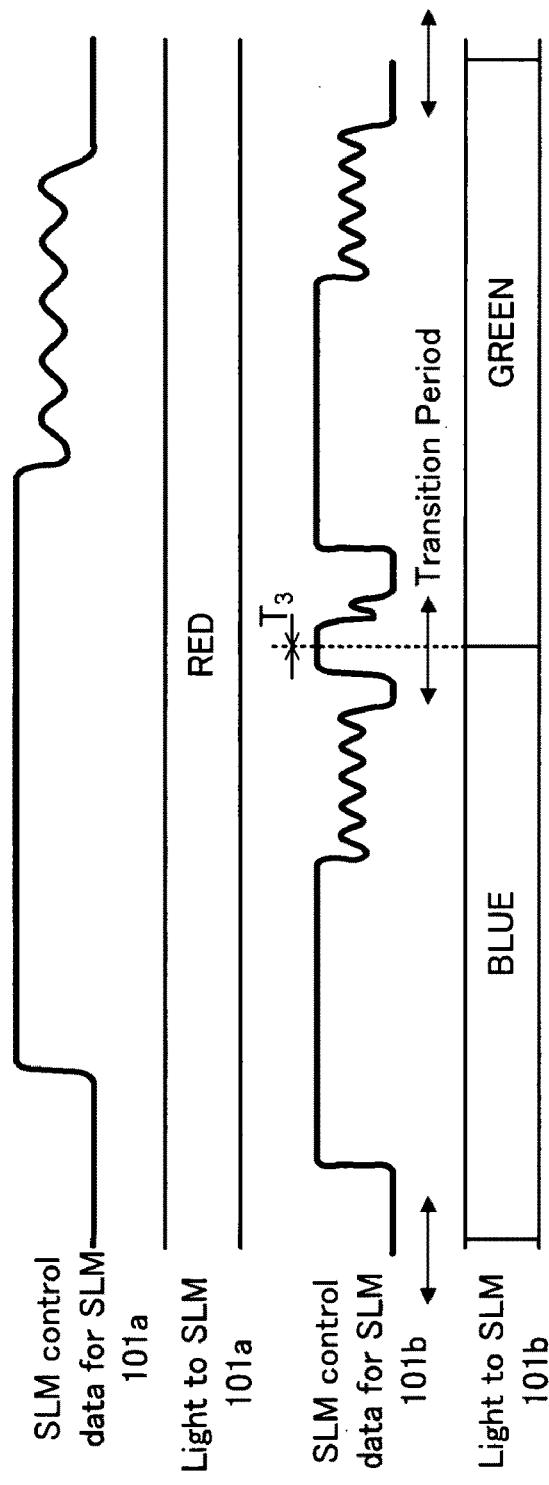
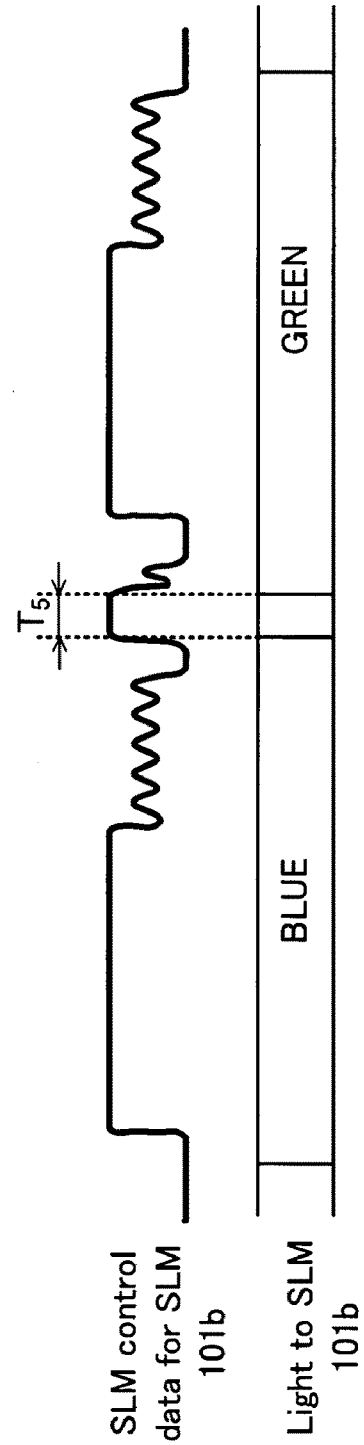

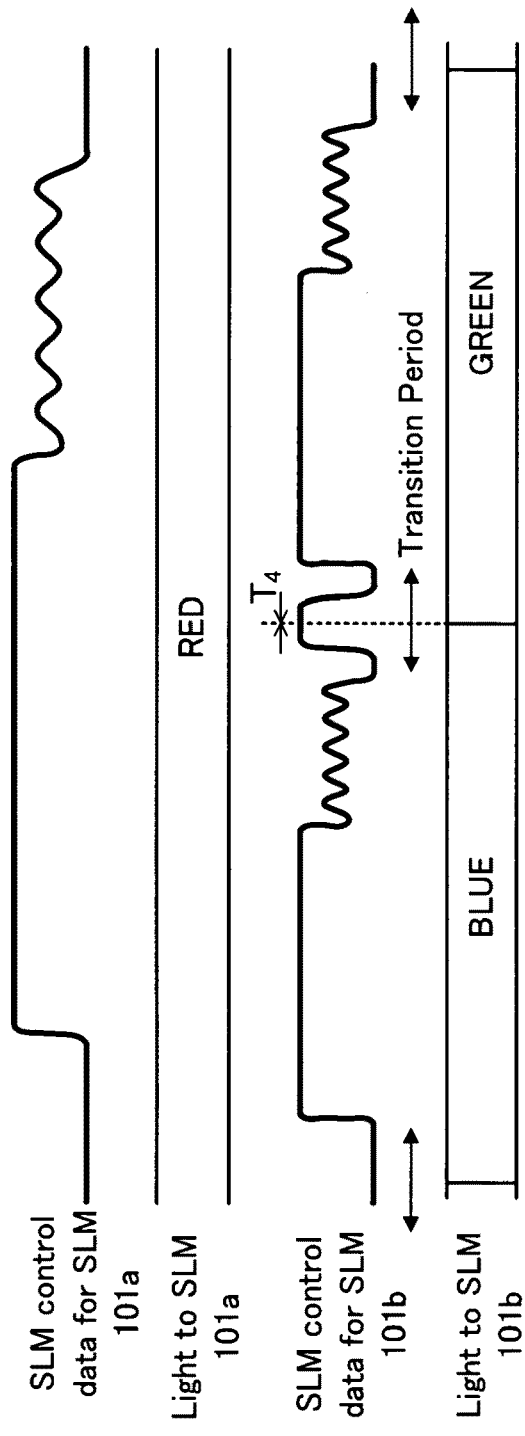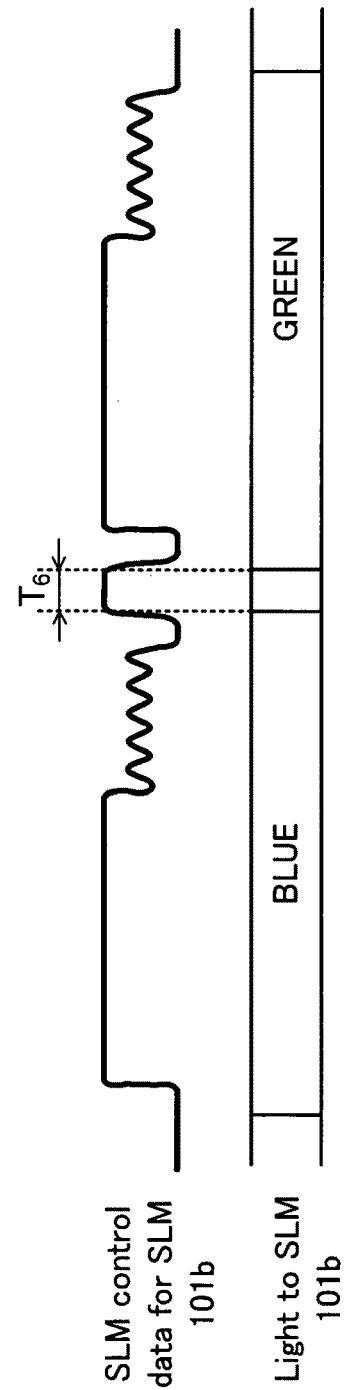

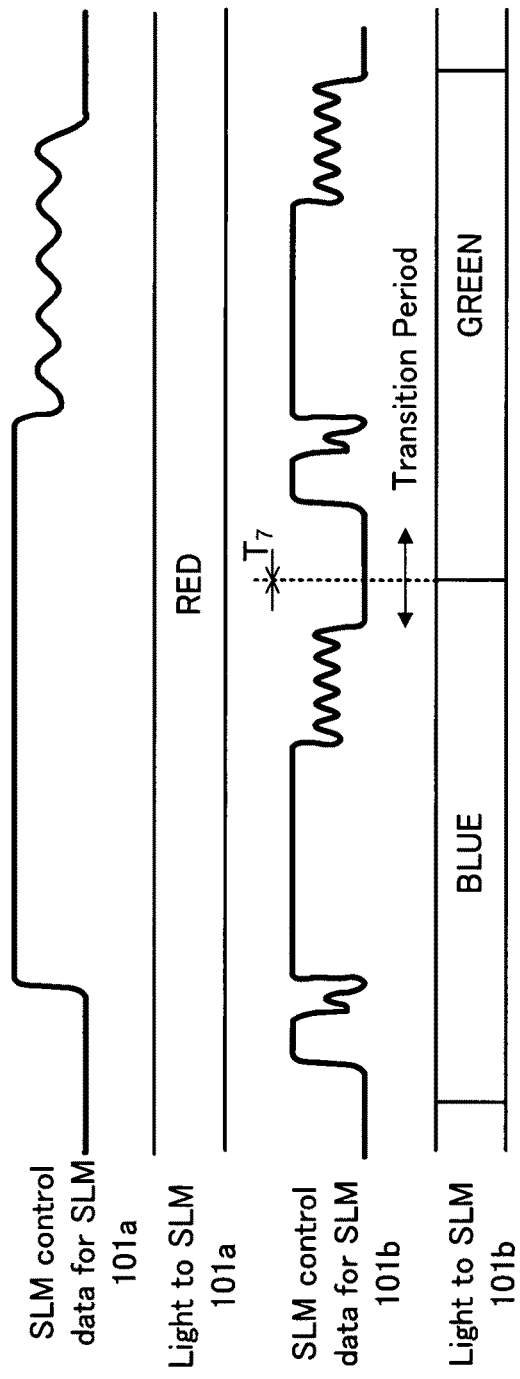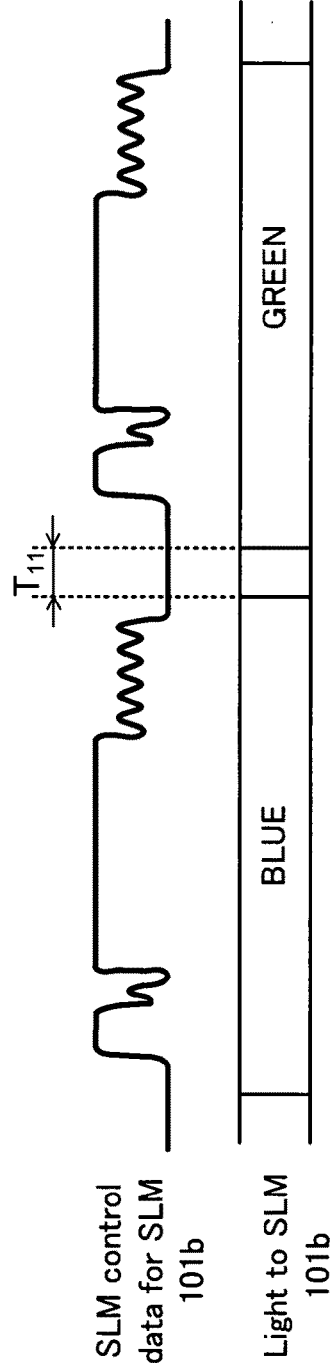
Fig. 16A
Fig. 16B

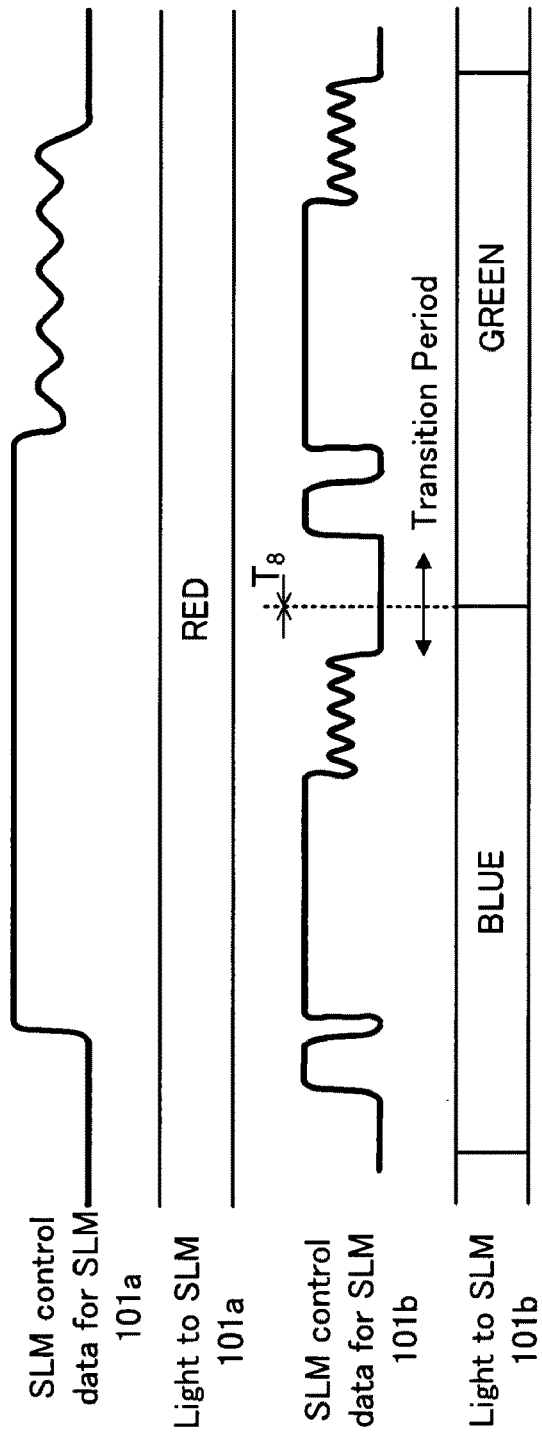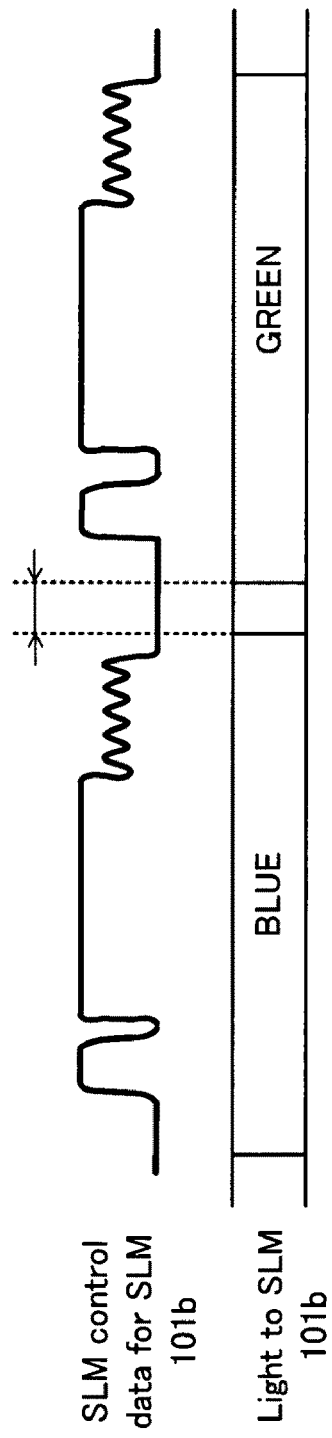

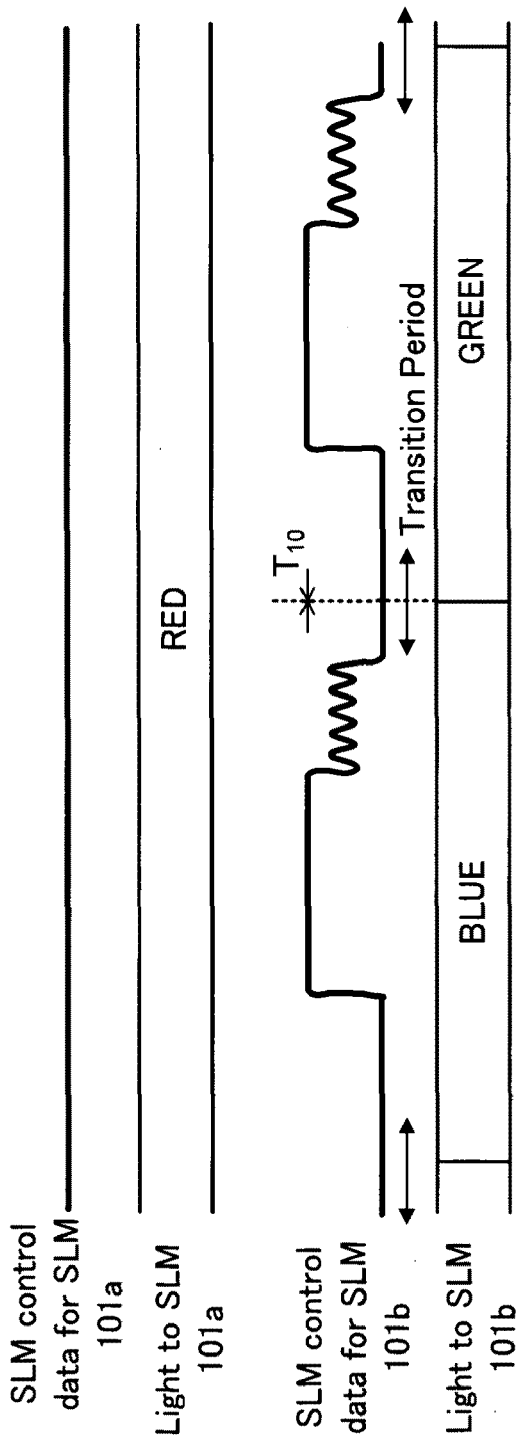
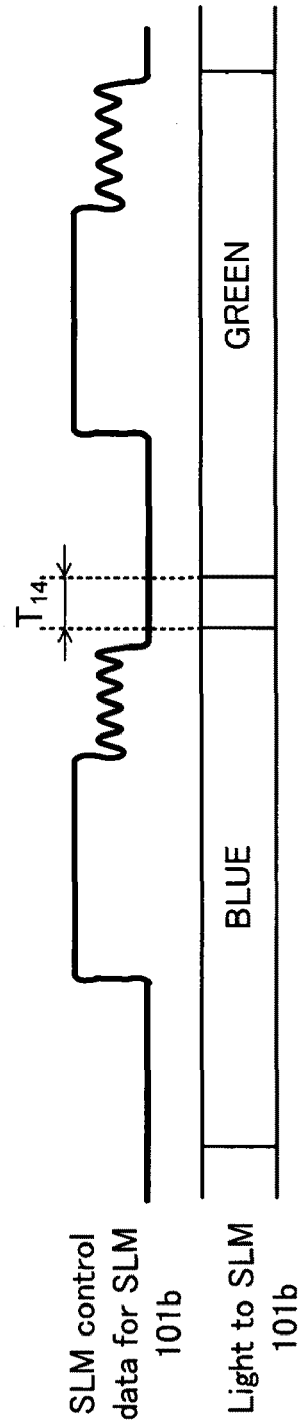
Fig. 19A
Fig. 19B

US 8,061,846 B2

LIGHT SOURCE CONTROL METHOD FOR VIDEO IMAGE DISPLAY APPARATUS AND VIDEO IMAGE DISPLAY APPARATUS

CROSS REFERENCE TO RELATED APPLICATIONS

This application is a Non-provisional Application claiming a Priority date of Dec. 4, 2007 based on a previously filed Provisional Application 61/005,286, a Non-provisional patent application Ser. No. 11/121,543 filed on May 3, 2005 issued into U.S. Pat. No. 7,268,932 and another Non-provisional application Ser. No. 10/698,620 filed on Nov. 1, 2003. The application Ser. No. 11/121,543 is a Continuation In Part (CIP) Application of three previously filed Applications. These three Applications are Ser. No. 10/698,620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to controlling a light source of a video image display apparatus. More particularly, the present invention relates to a video image display apparatus implemented with multiple spatial light modulators for reflecting and modulating light of different colors controlled to project the lights with specially arranged time sequences to suppress the color break phenomena.

2. Description of the Related Art

Even though there have been significant advances made in recent years in the technology of implementing electromechanical micromirror devices as spatial light modulators (SLM), there are still limitations and difficulties when these are employed to display high quality images. Specifically, when the display images are digitally controlled, the quality of the images is adversely affected because the images are not displayed with a sufficient number of gray scale gradations.

Electromechanical mirror devices are drawing a considerable amount of interest as spatial light modulators (SLM). The electromechanical mirror device consists of a mirror array arranging a large number of mirror elements. In general, the number of mirror elements range from 60,000 to several millions and are arranged on the surface of a substrate in an electromechanical mirror device.

Refer to FIG. 1A for a digital video system 1 as disclosed in a relevant U.S. Pat. No. 5,214,420, which includes a display screen 2. A light source 10 is used to generate light energy to illuminate display screen 2. Light 9 is further concentrated and directed toward lens 12 by mirror 11. Lens 12, 13, and 14 serve a combined function as a beam collimator to direct light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes switchable reflective elements, e.g., micro-mirror devices 32 with elements 17, 27, 37, and 47 as reflective elements attached to a hinge 30, as shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

Each of the mirror elements constituting a mirror device functions as a spatial light modulator (SLM), and each mirror element comprises a mirror and electrodes. A voltage applied to the electrode(s) generates a Coulomb force between the mirror and the electrode(s), making it possible to control and incline the mirror. The inclined mirror is "deflected" according to a common term used in this patent application for describing the operational condition of a mirror element.

When a mirror is deflected with a voltage applied to the electrode(s), the deflected mirror also changes the direction of the reflected light in reflecting an incident light. The direction of the reflected light is changed in accordance with the deflection angle of the mirror. The present patent application refers to the light reflected to a projection path designated for image display as "ON light", and refers to a light reflected in a direction away from the designated projection path for image display as "OFF light". When only a portion of the reflected light is directed in the ON light direction and the light reflected by the mirror to the projection path is of lesser intensity than the "ON light", it is referred to as "intermediate light".

The present patent application defines an angle of rotation along a clockwise (CW) direction as a positive (+) angle and that of a counterclockwise (CCW) direction as a negative (−) angle. A deflection angle is defined as zero degrees (0°) when the mirror is in the initial state.

The on-and-off states of a micromirror control scheme, such as that implemented in the U.S. Pat. No. 5,214,420 and by most conventional display systems, limit image display quality. This is because the application of a conventional control circuit limits the gray scale (PWM between ON and OFF states) by the LSB (least significant bit, or the least pulse width). Due to the ON-OFF states implemented in conventional systems, there is no way to provide a pulse width shorter than the LSB. The least brightness, which determines the gray scale, is the light reflected during the least pulse width. A limited gray scale leads to lower image quality.

In FIG. 1C, a circuit diagram of a control circuit for a micro-mirror according to U.S. Pat. No. 5,285,407 is presented. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the Static Random Access switch Memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The mirror is driven by a voltage applied to the landing electrode and is held at a predetermined deflection angle on the landing electrode. An elastic "landing chip" is formed on the portion of the landing electrode that comes into contact with the mirror, and assists in deflecting the mirror towards the opposite direction when the deflection of the mirror is switched. The landing chip is designed to have the same potential as the landing electrode so that a shorting is prevented when the landing electrode is in contact with the mirror.

Each mirror formed on a device substrate has a square or rectangular shape, and each side has a length of 4 to 15 um. In this configuration, a portion of the reflected light is reflected not from the mirror surface but from the gaps between the mirrors or other surfaces of the mirror device. These "unintentional" reflections are not applied to project an image and are inadvertently generated. The contrast of the displayed image is degraded due to the interference from these unintentional reflections generated by the gaps between the mirrors. In order to overcome this problem, the mirrors are arranged on a semiconductor wafer substrate with a layout to minimize the gaps between the mirrors. One mirror device is generally designed to include an appropriate number of mirror elements, wherein each mirror element is manufactured as a deflectable mirror on the substrate for displaying a pixel of an image. The appropriate number of elements for displaying an image is configured in compliance with the display resolution standard according to the VESA Standard defined by the Video Electronics Standards Association or by television broadcast standards. When a mirror device is configured with the number of mirror elements in compliance with WXGA (resolution: 1280 by 768) defined by VESA, the pitch between the mirrors of the mirror device is 10 μm, and the diagonal length of the mirror array is about 0.6 inches.

The control circuit, as illustrated in FIG. 1C, controls the mirrors to switch between two states, and the control circuit drives the mirror to oscillate to either an ON or OFF deflected angle (or position) as shown in FIG. 1A.

The minimum intensity of light reflected from each mirror element for image display, i.e., the resolution of gray scale of image display for a digitally-controlled image display apparatus, is determined by the least length of time that the mirror may be controlled to stay in the ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits, where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Among conventional display apparatuses, comprised of one SLM as described above, a color display is projected by changing over, in a time sequence, the colors of light to be displayed onto a screen using a wheel, which is known as a color wheel and which comprises a plurality of color filters (e.g., red (R), green (G) and blue (B) color filters) possessing different wavelength bands of transmission light in a plurality of regions, and a plurality of laser lights (e.g., R, G and B laser lights) that emit the lights of different wavelength bands.

Such a display apparatus, however, attains a color display by projecting each of a plurality of color lights in a time sequence, and therefore a distortion phenomenon known as a "color breakup" (or a rainbow effect) is known to occur. A color breakup occurs when a rainbow-like image is instantly visible when, for example, a viewer shifts his or her point of focus on the screen.

Accordingly, it is desirable to design a display apparatus such that a color display is projected through the projection of a plurality of color lights onto a screen in a time sequence, while suppressing the occurrence of the above described color breakup.

SUMMARY OF THE INVENTION

In consideration of the situation described above, the present invention aims at providing an apparatus and method, both for suppressing the occurrence of the color breakup phenomenon in a display apparatus implementing a color display by projecting a plurality of color lights onto a screen in a time sequence.

In order to accomplish the above described aim, a method according to an aspect of the present invention is a method for controlling a light source of a video image display apparatus, comprising: projecting illumination lights to a first spatial light modulator (SLM) and a second SLM, and changing over a wavelength of one of the illumination lights projected to the second SLM in a sequence during a period when the wavelength of another one of the illumination lights projected to the first SLM having a flexibly adjustable wavelength.

Furthermore, a method according to another aspect of the present invention is a method for controlling a light source of a video image display apparatus, comprising: projecting illumination lights to a first spatial light modulator (SLM) and a second SLM, and projecting one of the illumination lights with a second wavelength different from another illumination light with first wavelength projected to the second SLM during a period when the light of the first wavelength projected to the first SLM whereby a period for projecting the light of the first wavelength is different from a period for projecting the light of the second wavelength.

Further, a method according to another exemplary embodiment of the present invention is a method for controlling a light source of a video image display apparatus, comprising: controlling a light source for emitting lights to a first spatial light modulator (SLM) and a second SLM, and changing over a wavelength of one of the lights projected to the first SLM in sequence during a period when a wavelength of another light projected to the second SLM having a flexibly adjustable wavelength.

Further an apparatus according to an aspect of the present invention is a video image display apparatus displaying a video image in accordance with a video image signal, comprising: a light source for emitting lights of at least three primary colors; a synthesis unit for synthesizing modulation lights from a first spatial light modulator (SLM) and a second SLM; and a light source control unit for controlling the lights projected to the first SLM and second SLM with a color of a modulation light synthesized by the synthesis unit includes one of the three primary colors and a complementary color generated from the primary colors.

BRIEF DESCRIPTION OF THE DRAWINGS

The present invention is described in detail below with reference to the following Figures.

FIG. 14A is a first diagram showing an exemplary control for two SLMs performed by an SLM controller;

FIG. 14B is a first diagram showing an exemplary control for two SLMs performed by an SLM controller in a video image display apparatus comprising a lamp light source and a color wheel;

FIG. 15A is a second diagram showing an exemplary control for two SLMs performed by an SLM controller;

FIG. 15B is a second diagram showing an exemplary control for two SLMs performed by an SLM controller in a video image display apparatus comprising a lamp light source and a color wheel;

FIG. 16A is a third diagram showing an exemplary control for two SLMs performed by an SLM controller FIG. 16B is a third diagram showing an exemplary control for two SLMs performed by an SLM controller in a video image display apparatus comprising a lamp light source and a color wheel;

FIG. 17A is a fourth diagram showing an exemplary control for two SLMs performed by an SLM controller FIG. 17B is a fourth diagram showing an exemplary control for two SLMs performed by an SLM controller in a video image display apparatus comprising a lamp light source and a color wheel;

FIG. 19A is a sixth diagram showing an exemplary control for two SLMs performed by an SLM controller FIG. 19B is a sixth diagram showing an exemplary control for two SLMs performed by an SLM controller in a video image display apparatus comprising a lamp light source and a color wheel;

DESCRIPTION OF THE PREFERRED EMBODIMENTS

The preferred embodiments of the present invention are described below with reference to the accompanying drawings.

Figure 1A:
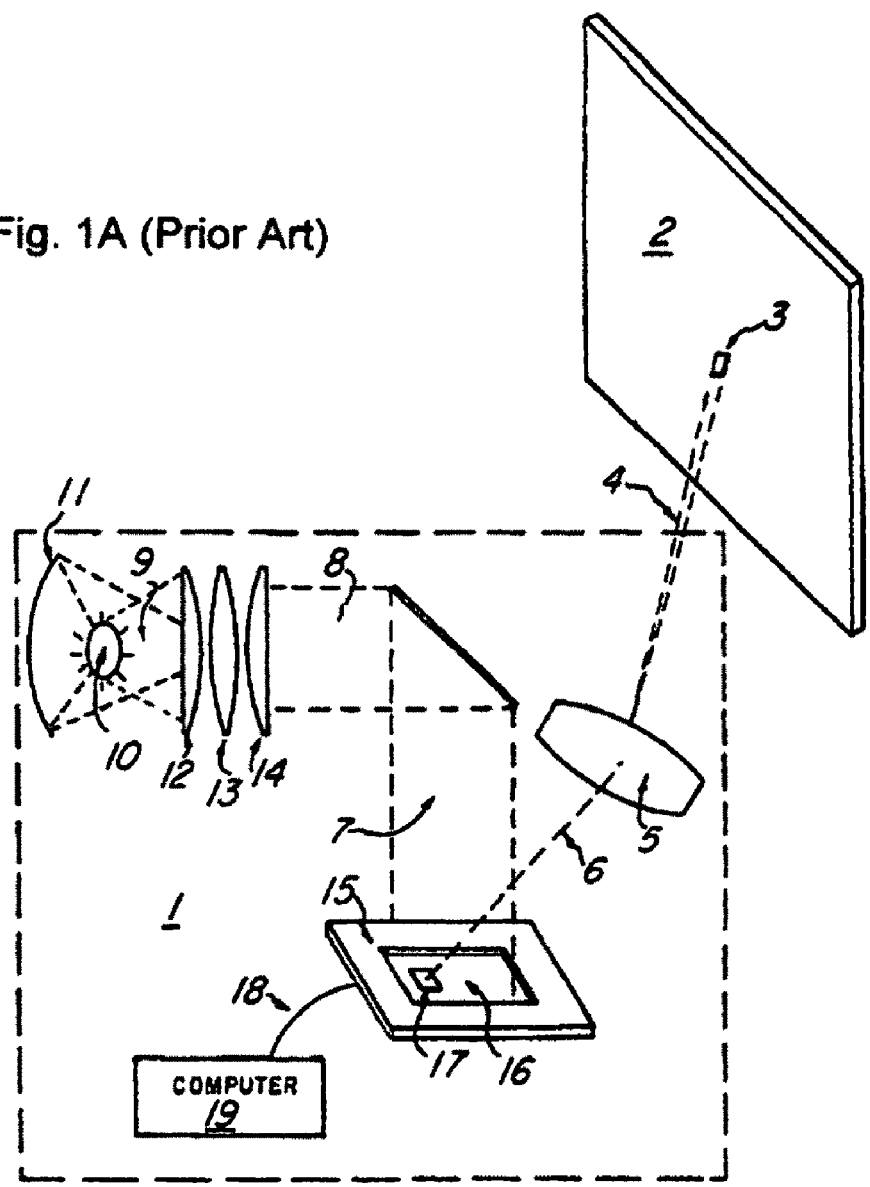
FIGS. 1A and 1B are, respectively, a functional block diagram and a top view of a portion of a micromirror array implemented as a spatial light modulator for a digital video display system of a conventional display system disclosed in a prior art patent.
Figure 1B:
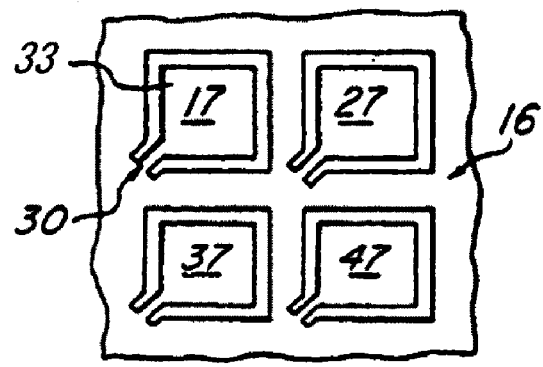
Figure 1C:
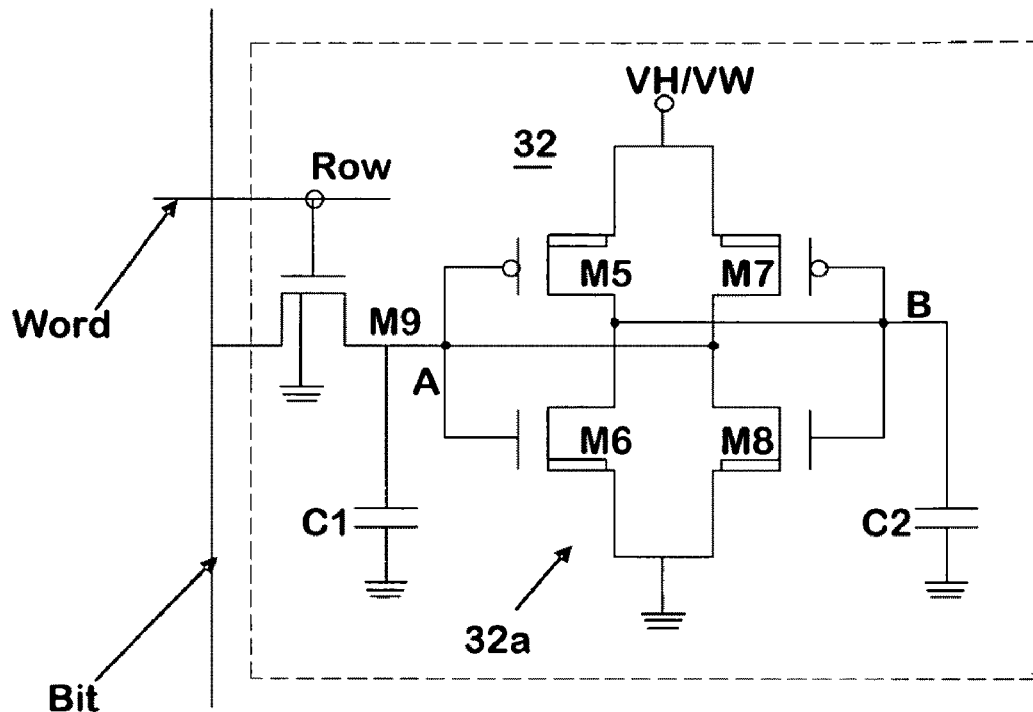
FIG. 1C is a circuit diagram for showing a prior art circuit for controlling a micromirror to position at an ON and/or OFF state of a spatial light modulator.
Figure 1D:
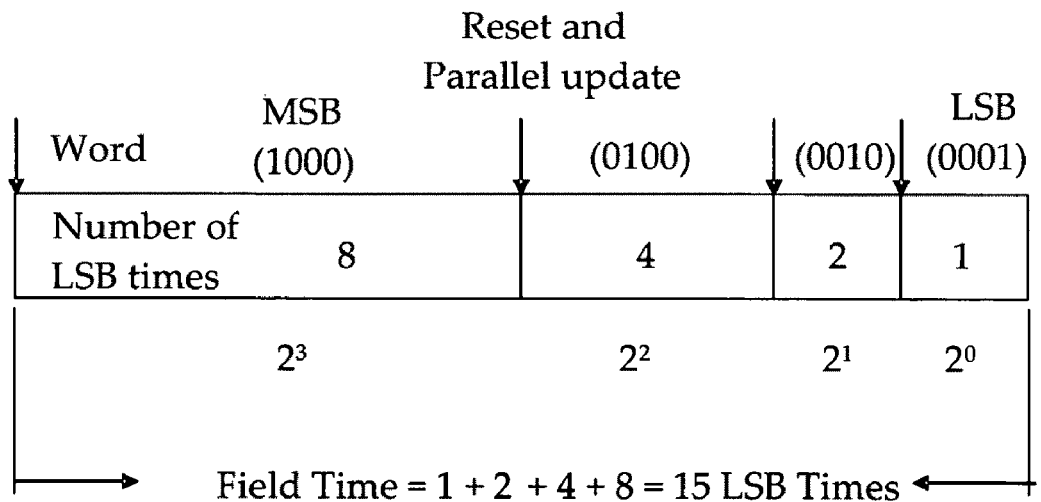
FIG. 1D is diagram for showing the binary time intervals for a four bit gray scale.
Figure 2A:
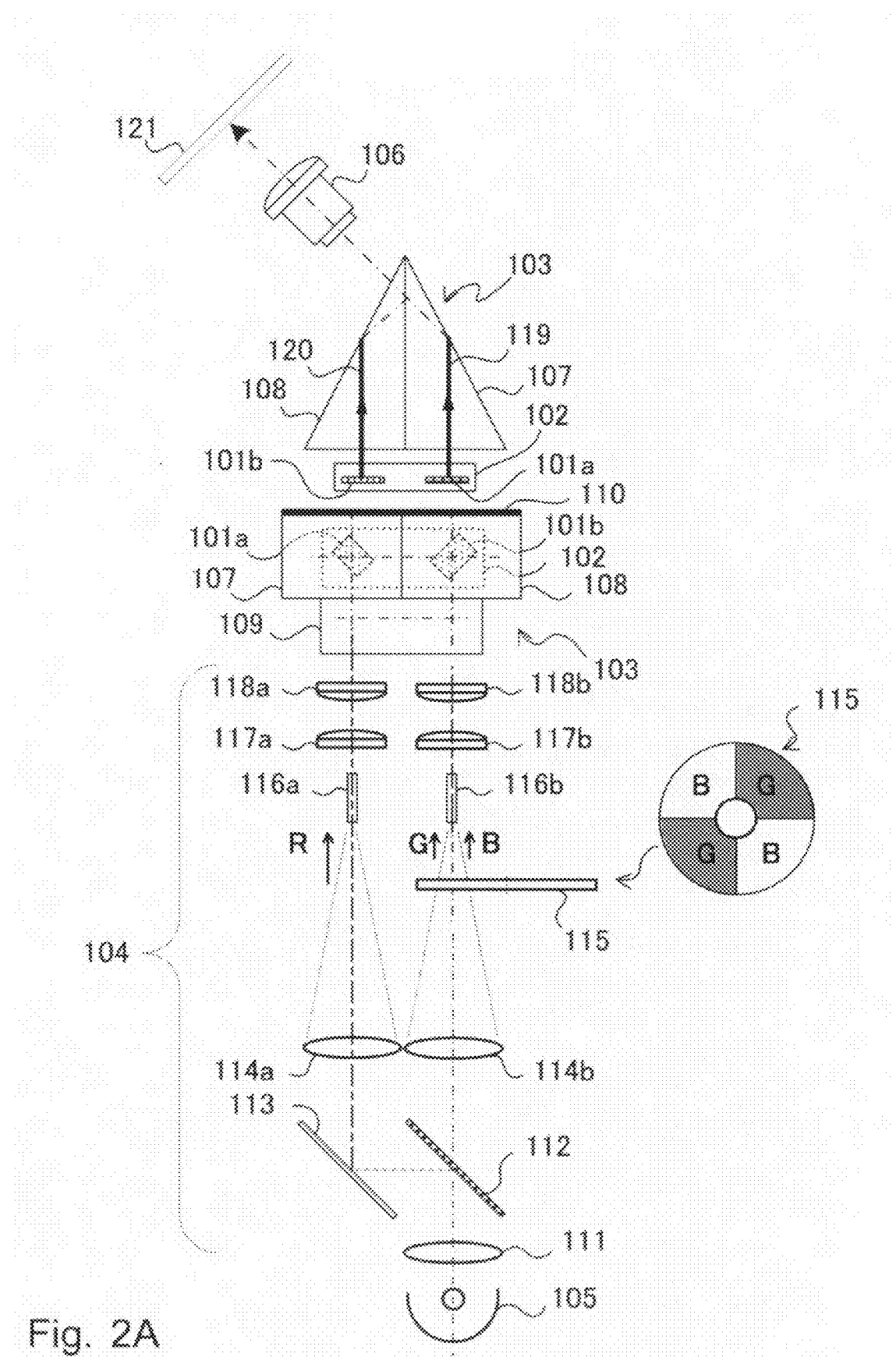
FIG. 2A is a diagram illustrating an exemplary optical comprisal of a video image display apparatus according to a first preferred embodiment.
Figure 2B:
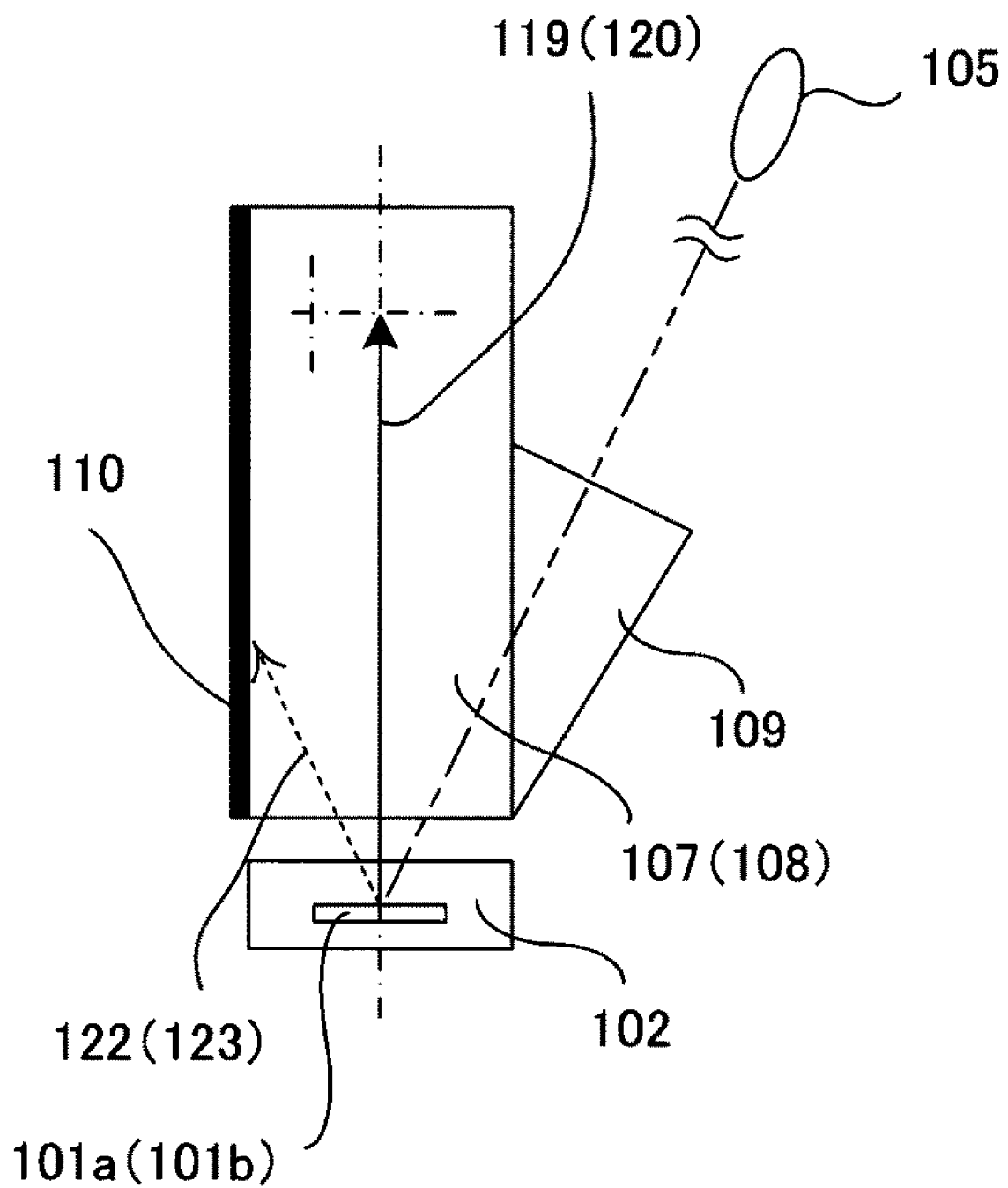
FIG. 2B is a side view diagram of a color synthesis optical system as a part of the optical comprisal shown in FIG. 2A.
Figure 2C:
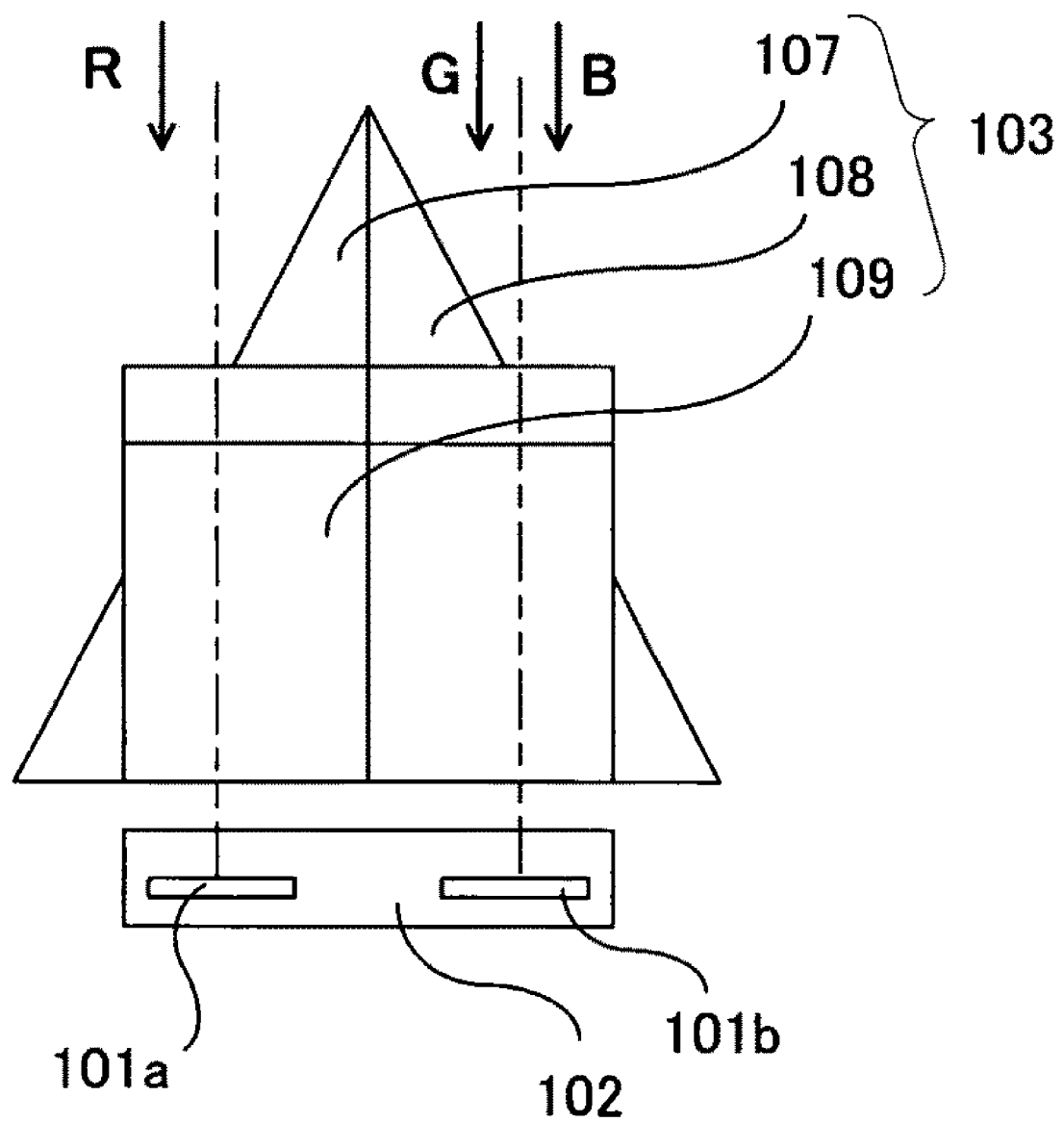
FIG. 2C is a front view diagram of the color synthesis optical system, a part of the optical comprisal shown in FIG. 2A.

FIG. 2A is a functional block diagram for illustrating a video image display apparatus that includes optical components according to a first preferred embodiment of the present invention. Specifically, FIG. 2A shows a video image display apparatus includes a color synthesis optical system for illustrating the color synthesis process with a top view and a rear view. FIG. 2B is a side view diagram for illustrating the optical transmissions of the same color synthesis optical system. FIG. 2C is a front view diagram of the color synthesis optical system.

The video image display apparatus according to the present embodiment comprises a device package 102 for containing two spatial light modulators (SLMs) 101 (i.e., 101a and 101b) therein. The video image display apparatus further includes a color synthesis optical system 103, a light source optical system 104, a light source 105, and a projection lens 106. More specifically, each of the two SLMs 101 is implemented with a micromirror device that includes a plurality of mirror elements configured as two-dimensional mirror array. Furthermore, the light source 105 is a lamp light source, e.g., a high-pressure mercury lamp or a xenon lamp.

Two SLMs 101a and 101b accommodated in the device package 102 are fixed within the rectangular package, with the rectangular contour of the SLM inclined by approximately 45 degrees within the horizontal plane relative to each side of the device package 102. The color synthesis optical system 103 is placed on the device package 102.

The upper part of the diagram FIG. 2A shows a rear view of the color synthesis optical system 103, while the lower part of the diagram shows a top view of the color synthesis optical system 103.

The color synthesis optical system 103 comprises right-angle triangle columnar prisms 107 and 108 that are adhesively attached along the length of each prism to constitute an approximate equilateral triangle column. The color synthesis optical system 103 further comprises of a right-angle triangle column light guide block 109, of which a sloped surface is adhesively attached to the side surface of the two aforementioned prisms 107 and 108, with the bottom surface of the light guide block 109 facing upwards.

A light absorber 110 is disposed on the side surface of the prisms 107/108 opposite the side to which the light guide block 109 is attached.

A light source optical system 104 disposed on the bottom part of the light guide block 109 has an optical axis of the light source optical system 104 vertically aligned. The light source optical system 104 comprises a collimator lens 111; a dichroic filter 112 reflecting only red wavelength light and transmitting only the lights of green and blue wavelengths; a support mirror 113; two condenser lenses 114 (i.e., 114a and 114b); a color wheel 115 constituted by four color filters alternately placing a color filter that transmits only green wavelength light and a color filter that transmits only blue wavelength light; two rod integrators 116 (i.e., 116a and 116b); two condenser lenses 117 (i.e., 117a and 117b); and two condenser lenses 118 (i.e., 118a and 118b).

The light projected from the light source 105 is transmitted first to the dichroic filter 112 via the collimator lens 111 of the light source optical system 104. The dichroic filter 112 reflects only the red light emitted from the light source 105, while only the green light as well as blue light is transmitted through the dichroic filter 112.

The red light reflected by the dichroic filter 112 is further reflected by the support mirror 113, and is incident to the SLM 101a, positioned right below the prism 107, by way of the condenser lens 114a, rod integrator 116a, condenser lens 117a, condenser lens 118a, light guide block 109, and prism 107.

Meanwhile, the green and blue lights, having transmitted through the dichroic filter 112, are incident to the color wheel 115 via the condenser lens 114b. The color wheel 115 transmits either the green or blue light, depending on a color filter inserted into the light path. The green or blue light, having transmitted through the color wheel 115, is incident to the SLM 101b, positioned right below the prism 108, by way of the rod integrator 116b, condenser lens 117b, condenser lens 118b, light guide block 109, and prism 108.

The red light projected to the SLM 101a is reflected vertically upward in the prism 107 as reflection light 119. When the mirror of the mirror element is in an ON state, the red reflection light 119 is further reflected by the outer side surface of the prism 107, is incident to the projection lens 106, and is projected onto a screen 121. When the mirror of the mirror element is in an OFF state, the light is reflected towards the light absorber 110 in the prism 107 as a reflection light 122 and is absorbed by the light absorber 110.

Meanwhile, the green or blue light, having been incident to the SLM 101b, is reflected vertically upward in the prism 108 as a reflection light 120. When the mirror of the mirror element is in the ON state, the reflection light 120 is further reflected by the outer side surface of the prism 108 and then the joined surface thereof, is incident to the projection lens 106 by way of the same light path as the red reflection light, and is projected onto the screen 121. When the mirror of the mirror element is in an OFF state, the light is reflected towards the light absorber 110 in the prism 108 as a reflection light 123 and is absorbed by the light absorber 110.

Alternately, the synthesis optical system 103 can also be implemented as a Philips prism and a polarization beam splitter (PBS), in addition to the optical components according to the configuration described above in the present embodiment.

As described above, the SLM 101a is irradiated only with red light and the SLM 101b is irradiated only with green or blue light, so that the modulation light respectively modulated by the two SLMs 101 are synthesized and condensed in the color synthesis optical system 103, as described above. The condensed lights are enlarged by the projection lens 106, and are projected onto the screen 121 in the video image display apparatus according to the present embodiment.

Figure 3:
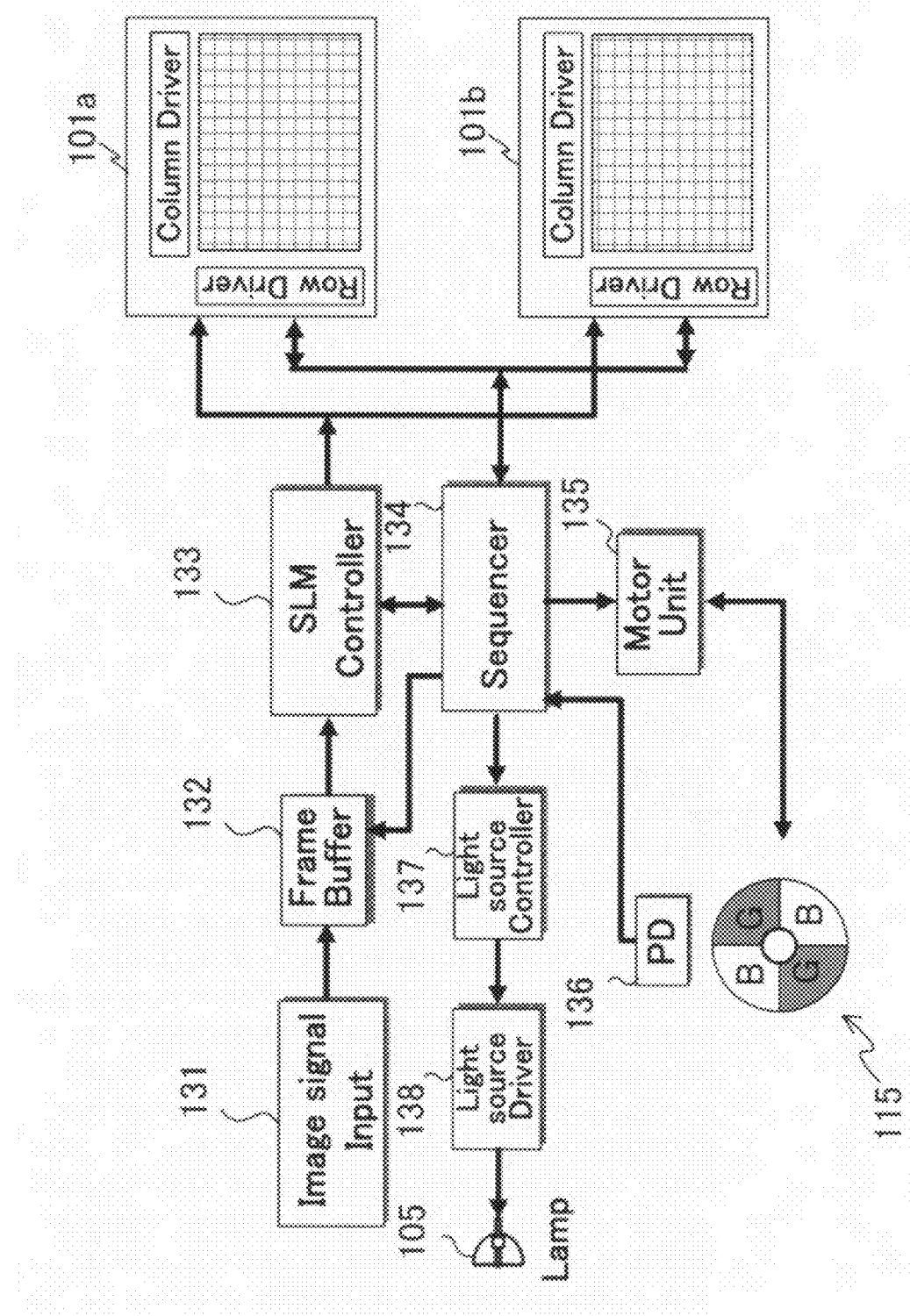
FIG. 3 is a functional block diagram illustrating the system configuration of a video image display apparatus comprising a timing control apparatus according to the first embodiment.

FIG. 3 is a functional block diagram illustrating the system configuration of a video image display apparatus comprising a timing control apparatus according to the present embodiment.

The video image display apparatus according to the present embodiment comprises an image signal input unit 131, a frame buffer 132, an SLM controller 133, a sequencer 134, a motor unit 135, a photo detector (PD) 136, a light source control unit 137, and a light source drive circuit 138.

The image signal input unit 131 receives an image signal extracted from a video image signal incoming from an external device (not shown in the drawing) converts image signal into image data.

The frame buffer 132 retains the image data converted by the image signal input unit 131. The present embodiment is configured to enable the frame buffer 132 to retain image data of multiple frames.

The SLM controller 133 applies the image data received from the frame buffer 132 to generate SLM control data (i.e., display data) for controlling the mirrors in the mirror elements to operate in the ON/OFF or intermediate states in SLM 101a and SLM 101b. Further, the SLM controller 133 also controls the display start position of the SLM 101. It is possible to start displaying, for example, from the center or the portion of mirror array in each of the SLM depending on the mode. However, the display usually starts from the top end of the SLM 101.

The sequencer 134 is implemented with a microprocessor to control the operational timing of the overall apparatus. The microprocessor may control the readout timing of image data from the frame buffer 132, the operational timing of the two SLMs, and the operational timing of the color wheel 115. The motor unit 135 controls the rotation speed of the color wheel 115 in accordance with a control signal from the sequencer 134. The PD 136 is a position detection device for detecting the angular position of the rotating color wheel 115 and angular position as detected is outputted to the sequencer 134 as a wheel index signal. The light source control unit 137 controls the light source drive circuit 138 in accordance with a control signal from the sequencer 134, and the light source drive circuit 138 controls the emission operation of the light source 105 in accordance with the aforementioned control.

Figure 4:
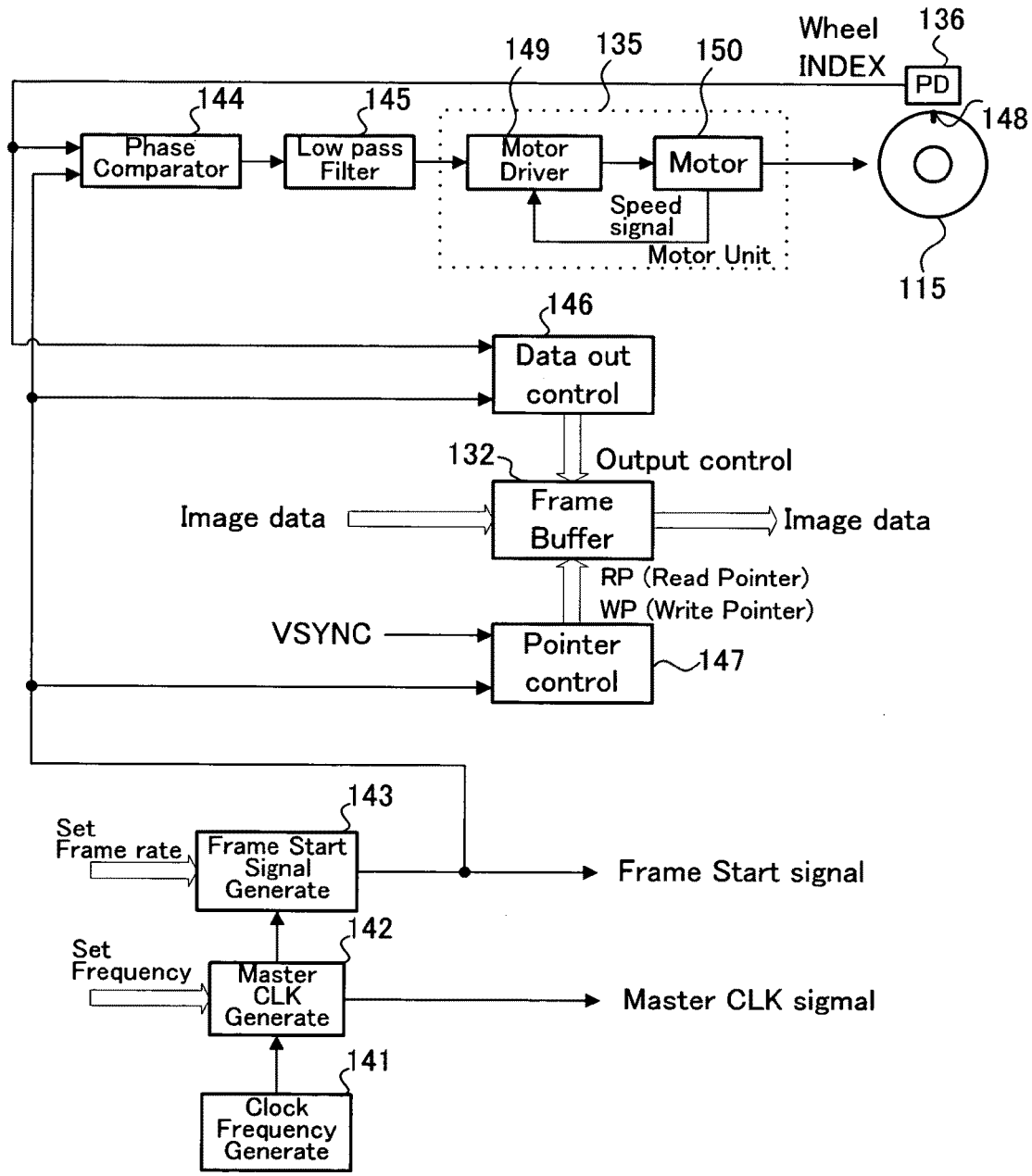
FIG. 4 is a functional block diagram showing, in detail, the internal configuration of a sequencer according to the first embodiment.

FIG. 4 is a functional block diagram for showing the internal configuration of the sequencer 134 according to the present embodiment. The sequencer 134, according to the present embodiment, comprises a clock frequency generation unit 141, a master clock generation unit 142, a frame start signal generation unit 143, a phase comparator 144, a low-pass filter 145, a data output control unit 146, and a pointer control unit 147. The clock frequency generation unit 141 generates a system clock signal. The master clock generation unit 142 generates, in accordance with the set frequency, a master clock signal constituting a reference clock for transferring image data to the SLM controller 133 from the system clock signal generated by the clock frequency generation unit 141. The frame start signal generation unit 143 generates, in accordance with the set frame rate, a frame start signal from the master clock generated by the master clock generation unit 142. The phase comparator 144 receives, as inputs, a wheel index signal output from the PD 136 and the frame start signal generated by the frame start signal generation unit 143, and outputs the difference in phases between both signals as an analog signal. Note that the PD 136 is provided to detect a black pattern 148 provided at a reference position on the color wheel 115 and outputs the detection signal as a wheel index signal. Further, the color wheel 115 is configured to turn one revolution within a period of displaying image data in the volume of one frame in a synchronous state.

The low-pass filter 145 eliminates a high frequency component from an analog signal output from the phase comparator 144 and outputs the resultant signal. Furthermore, the motor unit 135 includes a motor driver 149 and a motor 150. The motor driver 149 controls the rotation speed of the motor 150 in accordance with the output of the low-pass filter that in turn rotates the color wheel 115 in accordance with the output of the low-pass filter. Furthermore, the motor 150 comprises a speed detection device using a Hall element (not shown in the drawing) to control the motor driver and also control the rotation speed of the motor 150 under a target speed, in accordance with the output of the speed detection device. The rotation speed of the color wheel 115 is controlled to eliminate the phase difference between the wheel index signal and frame start signal and controls the rotation of the color wheel 115 at a rotation speed in accordance with the target rotation speed of the motor 150.

The data output control unit 146 controls the image data output from the frame buffer 132 according to whether or not the phase difference between the wheel index signal output from the PD 136 and the frame start signal generated by the frame start signal generation unit 143 is smaller than a predefined value.

The pointer control unit 147 controls the write position (i.e., the write address) of the image data to the frame buffer 132 according to the volume of one frame. The pointer control unit 147 further controls the read position (i.e., the read address) of image data according to the volume of one frame from the frame buffer 132 on the basis of a vertical synchronous signal (noted as "VSYNC" hereinafter) extracted from the video image signal incoming from an external device (not shown in the drawing) and of the frame start signal generated by the frame start signal generation unit 143. Here, the write position of image data by the volume of one frame is instructed by the value of a write pointer (WP) representing the write address. The read position of image data by the volume of one frame is instructed by the value of a read pointer (RP) representing the read address. Note that the frame buffer 132 secures a region to retain the image data by the volume of multiple frames simultaneously, and therefore, the possible values of the WP and RP are determined on the basis of the total number of pieces of image data by the volume of one frame because the frame buffer 132 is provided for retaining multiple frame of data simultaneously. The present embodiment defines the maximum value among the possible values of the WP and RP as the Max.

A timing control method carried out by a timing control apparatus in a video image display apparatus according to the present embodiment is described below.

Figure 5:
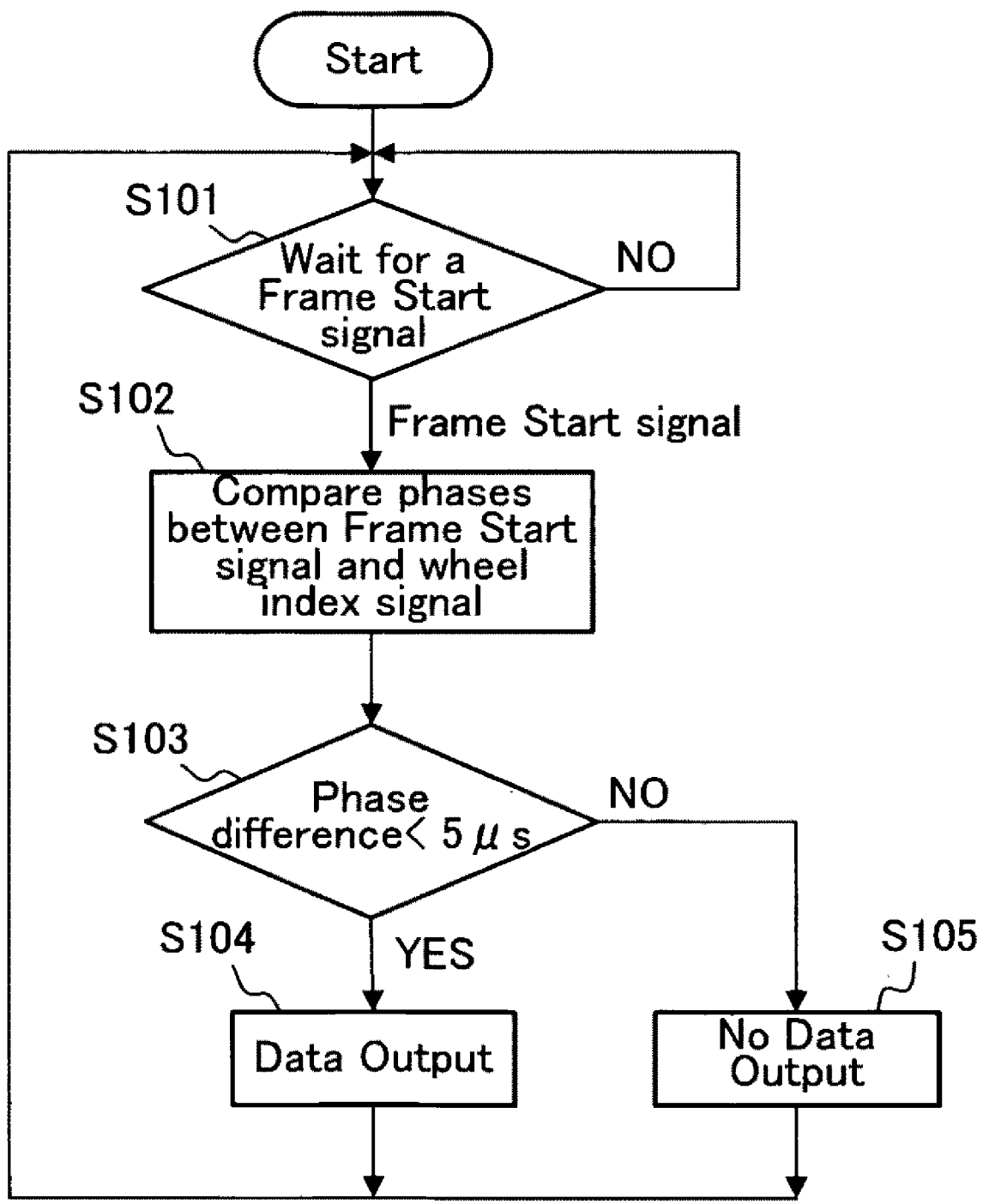
FIG. 5 is a flow chart showing, in detail, the operation of a data output control unit according to the first embodiment.

FIG. 5 is a flow chart for showing the operation processes of the above-described data output control unit 146 in more details.

The data output control unit 146 first determines whether or not a frame start signal has been inputted (S101). If the data output control unit 146 determines that no signal has been inputted, it repeats the determination process. If the data output control unit 146 determines that a frame start signal has been inputted, it then compares the phase between the frame start signal and wheel index signal (S102) and determines whether or not the phase difference between the two signals is smaller than a predefined value (S103), which is defined as 5 μs for the present embodiment. If the difference is smaller than a predefined value, the data output control unit 146 controls the data output so that the image data from the frame buffer 132 is simultaneously outputted with the frame start signal (S104). If the difference between the two signals is not smaller than the predefined value, the data output control unit 146 executes a control so that no image data is outputted from the frame buffer 132 (S105). Upon completion of the process of S104 or S105, the process returns to S101.

The above-described process controls the output of the image data when the phase difference between a frame start signal and a wheel index signal is smaller than a predefined value when the two signals are synchronized with each other. The processes further suspend an output of the image data when the aforementioned phase difference is greater than or equal to the predefined value, that is, when the two signals are not synchronized.

Therefore, the control processes stop the output of the image data from the frame buffer 132 (in the case of S105), and the mirrors of all mirror elements of the two SLMs are controlled to operate in the OFF state.

Figure 6:
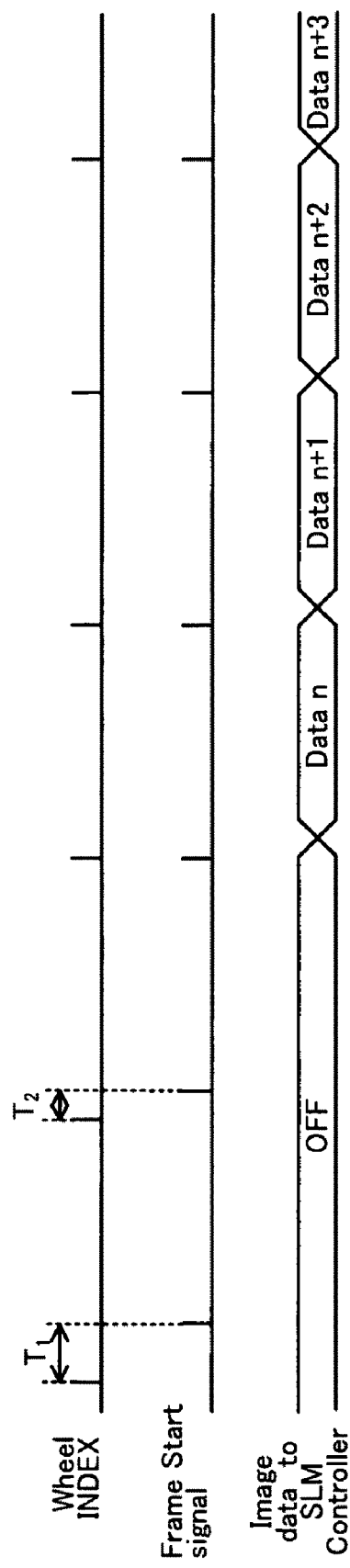
FIG. 6 is a timing chart showing, in detail, an exemplary operation of the data output control unit shown in FIG. 5.

FIG. 6 is a timing chart for showing an exemplary operation process of the data output control unit 146 of FIG. 5.

As illustrated in FIG. 6, if the phase difference T between a frame start signal and a wheel index signal greater than or equal to 5 μs (i.e., $T_1 \geqq 5$ μs and $T_2 \geqq 5$ μs), the frame buffer is controlled to stop an output of the image data (refer to "image data to SLM controller" being "OFF" on the far left of FIG. 6). If the phase difference between the two signals is smaller than 5 μs, the frame buffer 132 is controlled to output the image data (refer to "image data to SLM controller" being "data n", "data n+1", "data n+2" and "data n+3" in FIG. 6).

Note that while the present embodiment is configured to determine whether or not to output image data from the frame buffer 132 on the basis of a predefined value (i.e., 5 μs), the predefined value can be set at another arbitrary value. The control process further allows the flexibilities of changing the predefined values in accordance with the video image display apparatus used.

Figure 7:
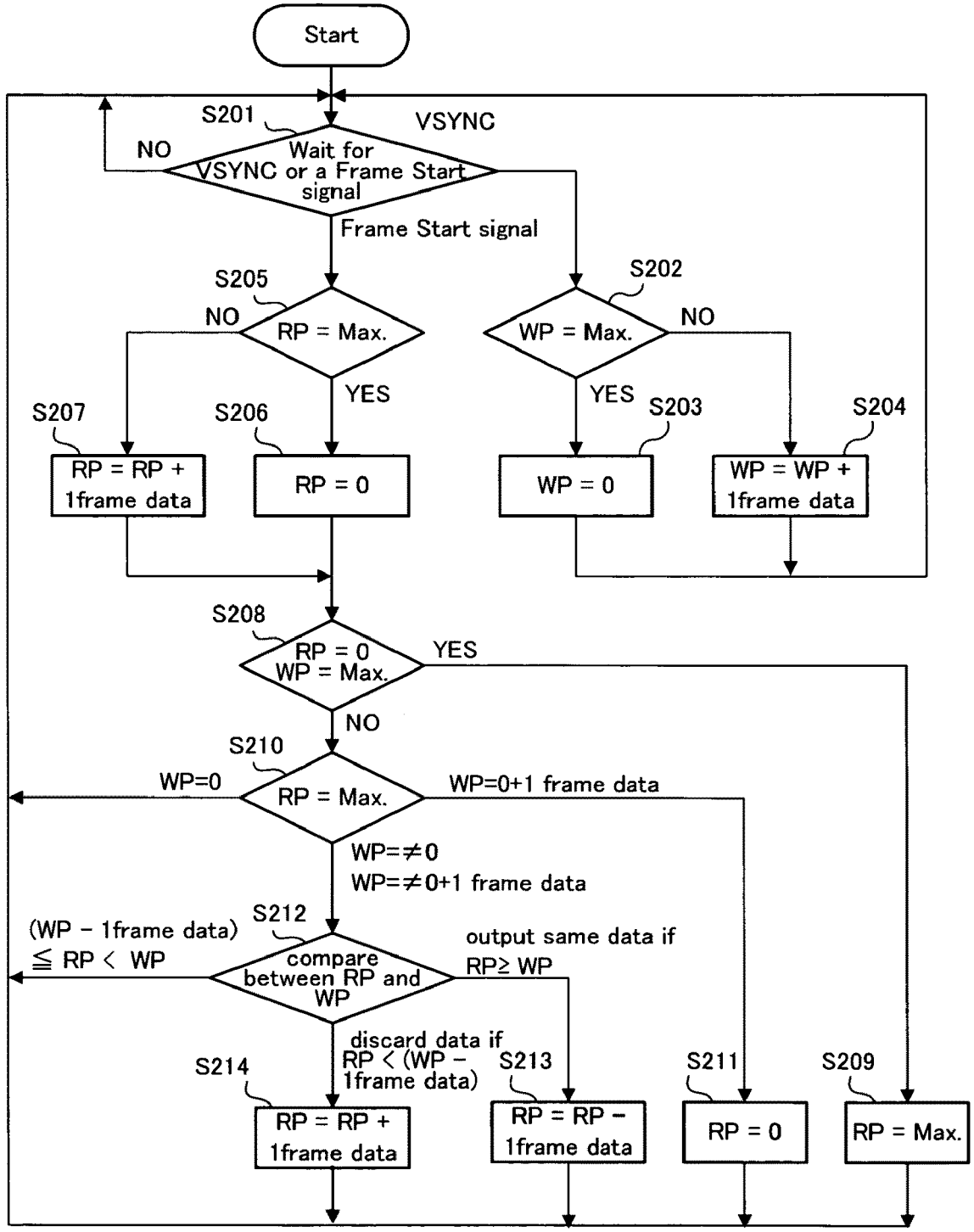
FIG. 7 is a flow chart showing, in detail, the operation of a pointer control unit according to the first embodiment.

FIG. 7 is a flow chart showing, in detail, the operation of the above-noted pointer control unit 147. It is assumed that WP and RP are initially set at Max, before the present process flow. Further assumed is that the signal inputted first to the pointer control unit 147 after starting the present flow is VSYNC.

The pointer control unit 147 begins by determining whether a VSYNC is inputted, a frame start signal is inputted, or neither is inputted (S201). If it is determined in S201 that neither is inputted, the determination process is repeated.

In contrast, if it is determined in S201 that VSYNC is inputted, then the pointer control unit 147 determines whether or not the value of WP is Max. (WP=Max.) (S202). Specifically, if the result is "yes", the value of WP is set at "0" (WP=0) to update the write position of the frame buffer 132 (S203). If the result is "no", a value corresponding to the image data by the volume of one frame is added to the value of WP (WP=WP+one-frame data) to update the write position of the frame buffer 132 (S204). Note that a value corresponding to the image data by the volume of one frame is added to the value of WP every time a VSYNC is input in S204, and therefore, the value of WP also corresponds to the number of times VSYNC is inputted. Then, upon completion of S203 or S204, the process returns to S201.

Meanwhile, if it is determined in S201 that a frame start signal is inputted, the pointer control unit 147 then determines whether or not the value of RP is Max (RP=Max) (S205). Here, if the result is "yes", the value of RP is set at "0" (RP=0) to update the read position of the frame buffer 132 (S206). If the result is "no", a value corresponding to the image data by the volume of one frame is added to the value of RP (RP=RP+one-frame data) to update the read position of the frame buffer 132 (S207). Note that a value corresponding to the image data by the volume of one frame is added to the value of RP every time a frame start signal is input in S207, and therefore, the value of RP also corresponds to the number of times the frame start signals are inputted.

After S206 or S207, the pointer control unit 147 determines whether or not the value of RP is "0" and whether the value of WP is Max (RP=0 and WP=Max) (S208). If the result is "yes", the value of RP is set at Max (RP=Max) to update the read position of the frame buffer 132 (S209), and then the process returns to S201.

In contrast, if the result of S208 is "no", the pointer control unit 147 then determines whether the value of RP is Max and whether the value of WP is "0" (RP=Max and WP=0); it also determines whether the value of RP is Max and whether the value of WP is equal to a value obtained by adding a value corresponding to the image data by the volume of one frame to "0" (RP=Max and WP=(0+one-frame data) (S210). If the result of S210 is "RP=Max and WP=(0+one-frame data)", the value of RP is set at "0" (RP=0) to update the read position of the frame buffer 132 (S211), and the process returns to S201. If the result of S210 is "RP=Max and WP=0", the process returns to S201. If the result of S210 is "RP=Max and WP≠0 and WP≠(0+one-frame data)", then the pointer control unit 147 compares the value of RP and the value of WP, and determines whether the value of RP is no less than the value of WP (RP≧WP), or the value of RP is smaller than a value obtained by subtracting a value corresponding to the image data by the volume of one frame from the value of WP (RP<(WP−one-frame data)), or neither of the aforementioned cases ((WP−one-frame data)≦RP<WP) (S212).

Note that the comparison between the value of RP and the value of WP performed in S212 is actually carried out by a comparison unit internally comprised in the pointer control unit 147. If the result of S212 is "RP≧WP", a value corresponding to the image data by the volume of one frame is subtracted from the value of RP (RP=RP−one-frame data) to update the read position of the frame buffer 132 (S213), and the process then returns to S201. If the result of S212 is "RP<(WP−one-frame data)", a value corresponding to the image data by the volume of one frame is added to the value of RP (RP=RP+one-frame data) to update the read position of the frame buffer 132 (S214), and the process then returns to S201. If the result of S212 is "(WP−one-frame data)≦RP<RP", the process then returns to S201.

Note that the value of WP is updated in S203 or S204 in this present flow chart, and the image data by the volume of one frame is written to the frame buffer 132 in accordance with the update value of WP.

Furthermore, when the value of RP is updated in S209, S211, S213, and S214, the image data by the volume of one frame is read from the frame buffer 132 in accordance with the update value of RP. Furthermore, if the result of S210 is "RP=Max and WP=0", or if the result of S212 is "(WP−one-frame data)≦RP<WP", the image data by the volume of one frame is read from the frame buffer 132 in accordance with the value of RP updated in S206 or S207. However, these readouts of data are carried out only when the data output control unit 146 controls the output of image data, as described above.

In these processes, if "RP≧WP" is determined in S212, the image data by the volume of one frame, which is the same as the image data by the volume of one frame that was outputted to the SLM controller 133 from the frame buffer 132, is outputted to the SLM controller 133. Furthermore, if "RP<(WP−one-frame data)" is determined in S212, the readout of the image data by the volume of one frame that was written immediately prior to the image data by the volume of one frame last written to the frame buffer 132 will not be performed. Therefore, the readout of one piece of the image data by the volume of one frame will be skipped.

Figure 8:
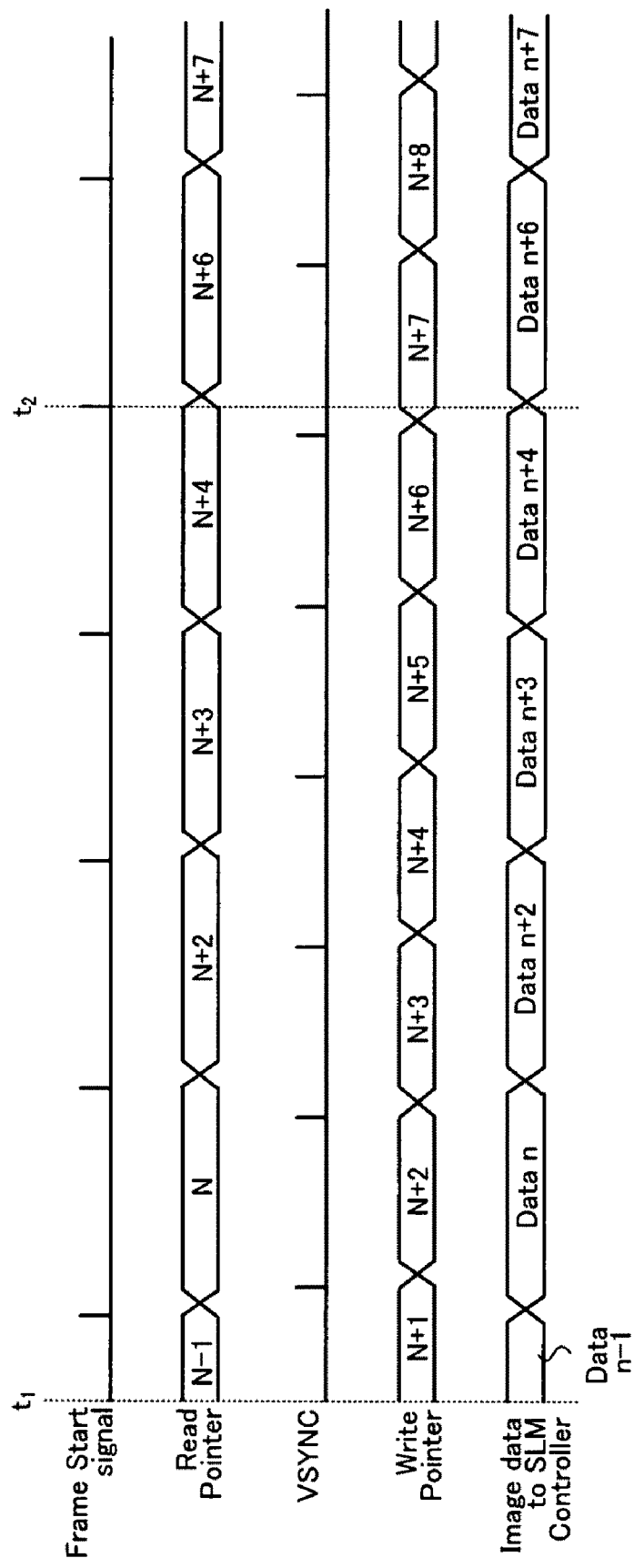
FIG. 8 is a first timing chart showing an exemplary operation of the pointer control unit shown in FIG. 7.
Figure 9:
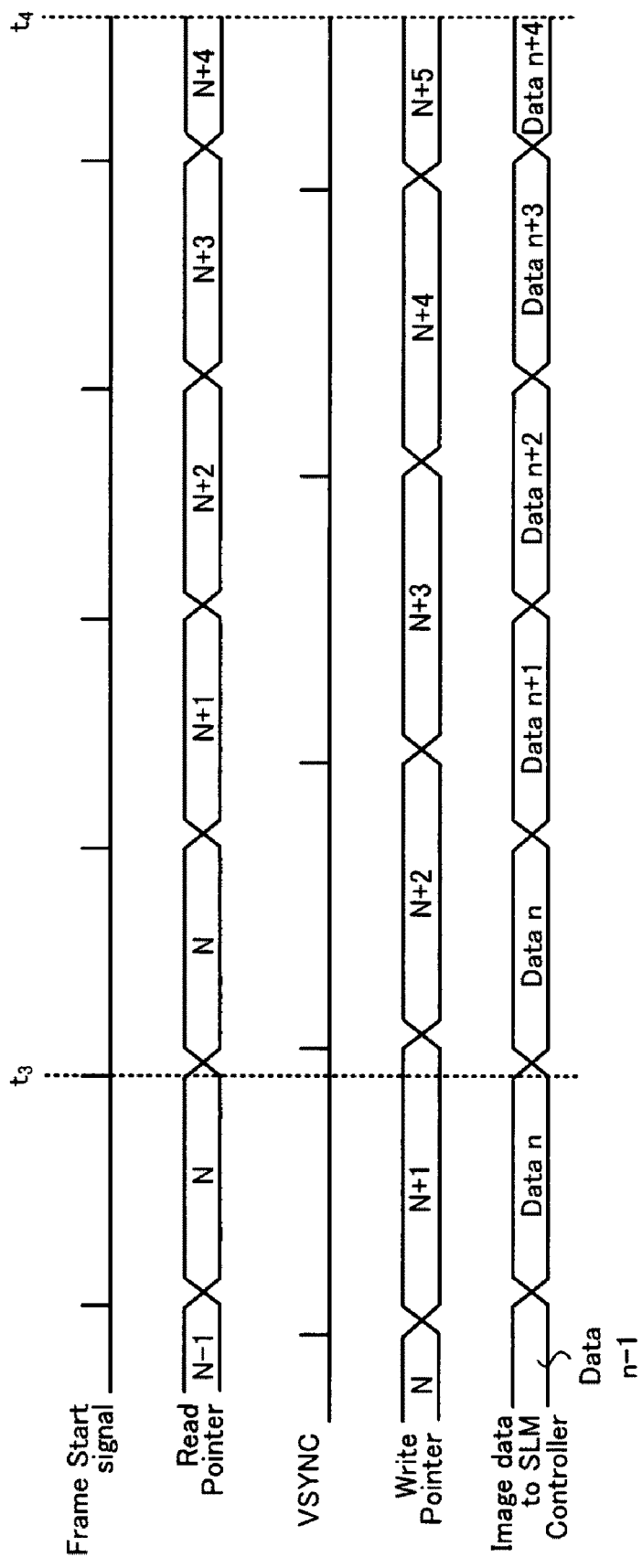
FIG. 9 is a second timing chart showing an exemplary operation of the pointer control unit shown in FIG. 7.

FIGS. 8 and 9 are timing charts for showing such an exemplary operation of the pointer control unit 147 shown in FIG. 7.

Specifically, the value of RP ("read pointer") shown in FIGS. 8 and 9 as "N+2", as, indicates that the value of RP is obtained by adding a value corresponding to the image data by the volume of (N+2) frames to "0" (i.e., RP=0+(N+2)−frame data). Furthermore, the value of WP ("write pointer") is obtained in a similar manner.

FIG. 8 illustrates the case in which the frequency of VSYNC is higher than the frequency of the frame start signal. In this example;

In the time period from time $t_1$ to time $t_2$: if the determination result of the above described S212 is "(WP−one-frame data)≦RP<WP," the image data by the volume of one frame is written to the frame buffer 132 sequentially, in accordance with the value of WP that is updated in the above described S204. The process is in synchronous with the VSYNC and also the image data by the volume of one frame is read from the frame buffer 132 sequentially in accordance with the value of RP that is updated in the above described S207 in synchronous with the frame start signal.

At time $t_2$: when a frame start signal is inputted, the value of RP is updated to "N+5" in the above-described S207. In this event, the value of WP is "N+7", causing the determination result of the above described S212 to be "RP<(WP−one-frame data)", and therefore, the value of RP is updated to "N+6" in the above described S214. Therefore, the image data by the volume of one frame written in accordance with the value of WP="N+5" is not read and the readout is skipped.

Accordingly, if the frequency of VSYNC is higher than the frequency of a frame start signal, one frame of image data is skipped and not read under the above described condition when "RP<(WP−one-frame data)" applies.

In contrast, FIG. 9 illustrates the case in which the frequency of VSYNC is lower than the frequency of a frame start signal.

At $t_3$: when a frame start signal is inputted, the value of RP is updated to "N+1" in the above-described step S207. In this event, the value of WP is also "N+1", causing the determination result of the above-described S212 to be "RP≧WP", and therefore, the value of RP is updated to "N" in the above-described step S213. Therefore, one frame of image data that was last outputted to the SLM controller 133 from the frame buffer 132. Specifically, one frame of the image data same as the one frame of image data that has been read in accordance with the value of RP="N", are transferred to the SLM controller 133.

Before reach the time $t_4$: the determination process of the above-described step S212 generates a result of "(WP−one-frame data)≦RP<WP", and therefore, one frame of the image data is written to the frame buffer 132 sequentially, in accordance with the value of WP updated in the above described S204 in synchronous with the VSYNC. Furthermore, one frame of the image data is read from the frame buffer 132 sequentially in accordance with the value of RP updated in the above-described step S207 in synchronous with the frame start signal.

Therefore, if the frequency of a VSYNC is lower than the frequency of a frame start signal, one frame of the image data same as one frame of the image data most recently transferred from the frame buffer 132 to the SLM controller 133, is transferred once more to the SLM controller 133 when the above described condition "RP≧WP" applies.

According to the present embodiment described above, the video image display apparatus is configured to carry out operations based on a frame start signal individually generated within the sequencer for controlling the rotation of the color wheel 115, the readout of image data from the frame buffer 132, and the operation of the two SLMs 101. Thereby the operation of the apparatus will not depend on an externally inputted synchronous signal (VSYNC). Therefore, it is not required to configure a circuit responsive to various frequencies of externally inputted synchronous signals, and the circuit can be accordingly simplified. It is further possible to stably maintain the operations of the apparatus even if the externally inputted synchronous signals are unstable.

Second Embodiment

Figure 10:
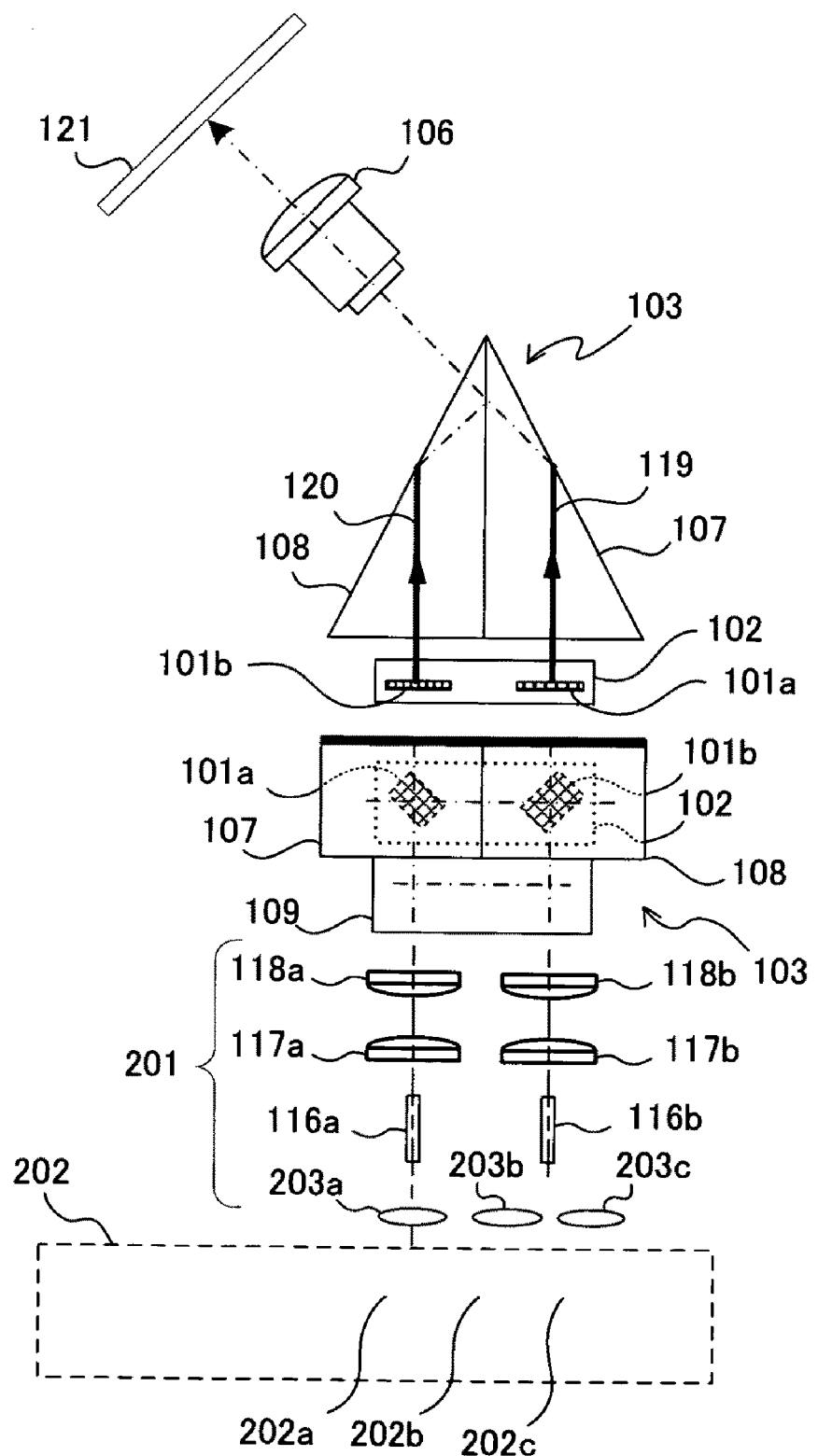
FIG. 10 is a diagram illustrating the optical comprisal of a video image display apparatus comprising an SLM control apparatus according to a second preferred embodiment.

FIG. 10 is a functional block diagram for illustrating the optical components of a video image display apparatus that includes an SLM control apparatus according to a second preferred embodiment of the present invention. A color synthesis optical system 103 is illustrated in FIG. 10 as a top view in the upper portion and a rear view in the lower portion of FIG. 10.

The video image display apparatus according to the present embodiment comprises a device package 102, containing two spatial light modulators (SLMs) 101 (i.e., 101a and 101b) accommodated as an integrated package; a color synthesis optical system 103; a light source optical system 201; a light source 202; and a projection lens 106. Note that the device package 102 in which two spatial light modulators (SLMs) 101 are situated, the color synthesis optical system 103, and projection lens 106 are the same as those shown in FIGS. 2A through 2C, and therefore further descriptions are not provided here. The light source optical system 201 comprises three condenser lenses 203 (i.e., 203a, 203b, and 203c), two-rod integrators 116 (i.e., 116a and 116b), two condenser lenses 117 (i.e., 117a and 117b), and two condenser lenses 118 (i.e., 118a and 118b).

The light source 202 comprises a red laser light source 202a for emitting a laser light in the wavelength of red (simply noted as "red laser light" hereinafter), a green laser light source 202b for emitting a laser light of the wavelength of green (simply noted as "green laser light" hereinafter), and a blue laser light source 202c for emitting a laser light of the wavelength of blue (simply noted as "blue laser light" hereinafter). Alternately, the present embodiment may be configured to implement a light emitting diode (LED) light source instead of the laser light source.

According to the present embodiment, the red laser light source 202a emits the red laser light to project through the rod integrator 116a, condenser lens 117a, condenser lens 118a, light guide block 109, and prism 107 via the condenser lens 203a and is incident to the SLM 101a disposed right below the prism 107. The red laser light is reflected from the SLM 101a, and transmitted through the same light path as described with reference to FIGS. 2A through 2C, and therefore further descriptions are not provided here.

Meanwhile, the green laser light source 202b emits the green laser light for projecting through the rod integrator 116b, condenser lens 117b, condenser lens 118b, light guide block 109, and prism 107 via the condenser lens 203b and is incident to the SLM 101b disposed right below the prism 107. Similarly, the blue laser light source 202c emits the blue laser light for projecting through the rod integrator 116b, condenser lens 117b, condenser lens 118b, light guide block 109, and prism 107 via the condenser lens 203c and is incident to the SLM 101b positioned right below the prism 107. According to the present embodiment, the green laser light and blue laser light are respectively emitted in a time sequential manner from the green laser light source 202 and blue laser light source 202c. The light path of the green laser light and blue laser light reflected from the SLM 101b, is the same as the light path of the green light or blue light reflected from the SLM 101b as that described with reference to FIGS. 2A through 2C, and therefore further descriptions are not provided here.

Figure 11:
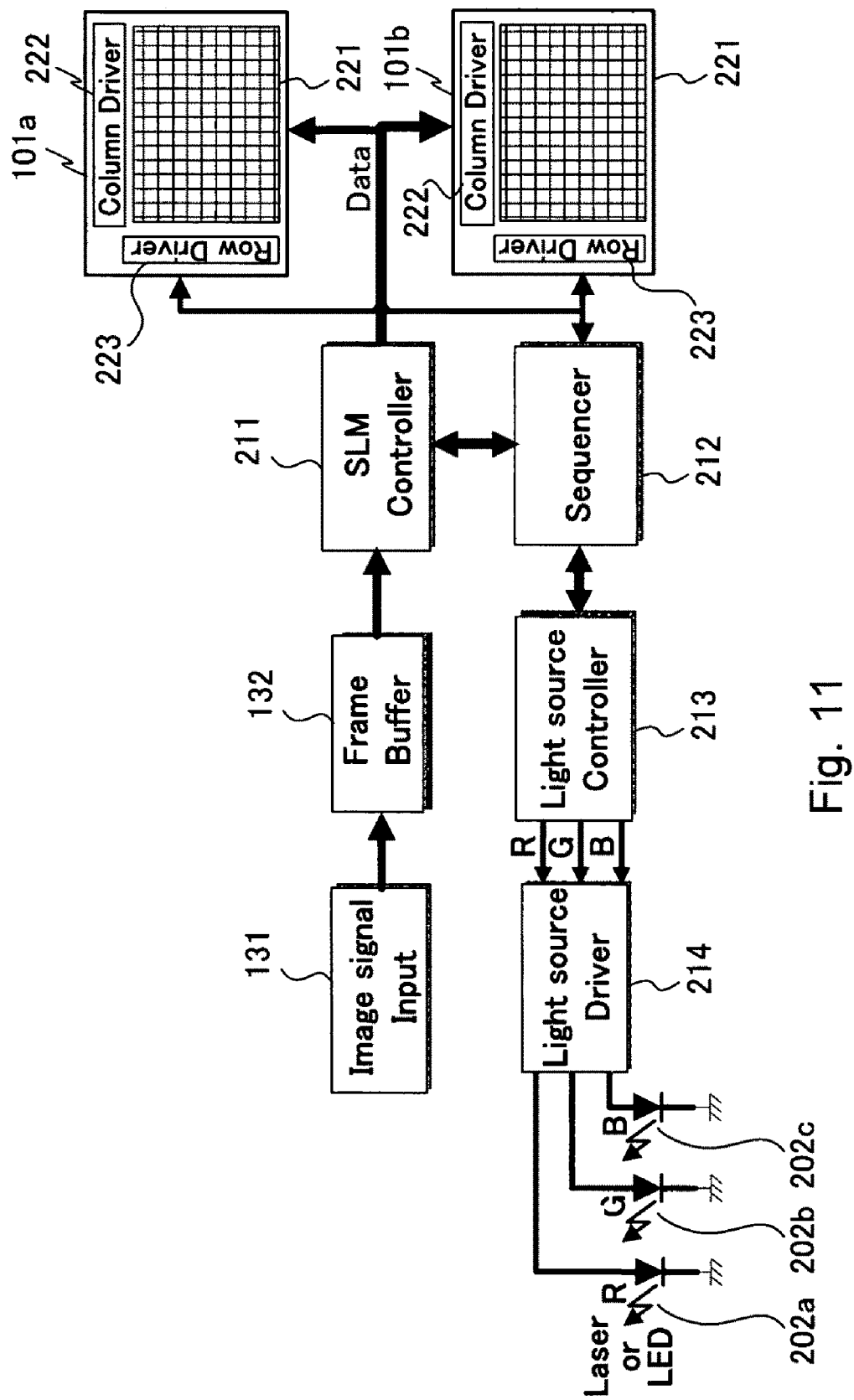
FIG. 11 is a functional block diagram illustrating the system comprisal of a video image display apparatus comprising an SLM control apparatus according to the second embodiment.

FIG. 11 is a functional block diagram illustrating the system configuration of a video image display apparatus comprising an SLM control apparatus according to the present embodiment.

The video image display apparatus according to the present embodiment comprises an image signal input unit 131, a frame buffer 132, an SLM controller 211, a sequencer 212, a light source control unit 213 and a light source drive circuit 214. Note that the image signal input unit 131 and frame buffer 132 are the same as those shown in FIG. 3 and therefore further descriptions are not provided here.

The SLM controller 211 generates SLM control data (i.e., display data) for controlling the mirror in each of the mirror elements to operate in the ON state, the OFF state, and an oscillation state for the mirror of the mirror element in the SLM 101a. The SLM controller 211 further generates SLM control data (i.e., display data) for controlling the mirror in each of the mirror elements to operate in the ON control, OFF control and oscillation state for the mirror of the mirror element in the SLM 101b. The SLM controller 211 applies the image data read from the frame buffer 132 and generates data to control the SLMs 101. Therefore, the SLM controller 211 digitally controls two SLMs 101 by transmitting the respective pieces of SLM control data to the corresponding SLMs 101.

The sequencer 212 comprises a microprocessor and related components to control the operational timing of the overall apparatus. The sequencer 212 controls the operational timing of the two SLMs 101 and the timing of the three laser light sources 202.

The light source control unit 213 controls the light source drive circuit 214, in accordance with the control signal received from the sequencer 212, and controls the emitting operation of the laser light source 202, in accordance with the light source drive circuit 214. Therefore, the light source control unit 213 controls the illumination lights incident to SLM 101a and SLM 101b.

Particularly, the present embodiment is configured with each of the two SLMs 101 comprises a mirror element array 221, a column driver 222, and a row driver 223. The mirror element array 221 includes a plurality of mirror elements arranged in a grid-like fashion generally referred to as mirror array with the mirror elements disposed at the positions where the individual bit lines vertically extended from the column driver 222 intersects with the word lines horizontally extended from the row driver 223. The SLM control data (i.e., display data) outputted from the SLM controller 211 is inputted to the column driver 222. The row driver 223 receives a timing signal outputted from the sequencer 212 to control the operation of the row.

Figure 12:
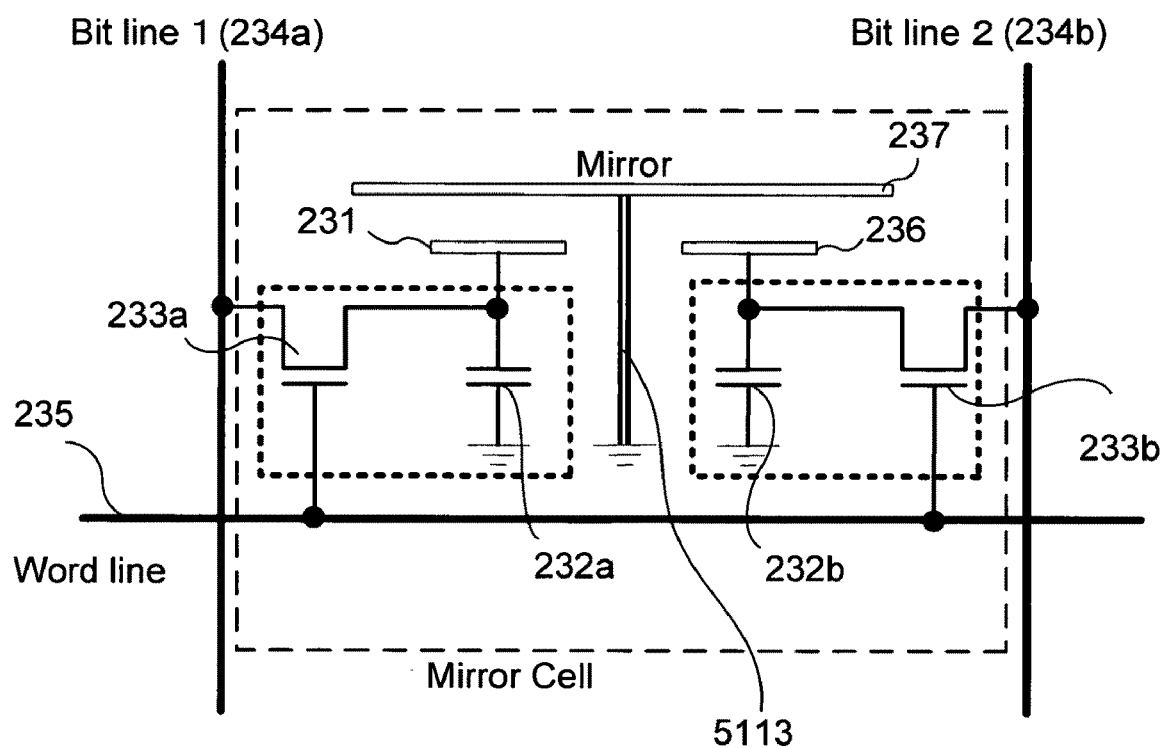
FIG. 12 is a diagram illustrating the circuit configuration of each mirror element.

FIG. 12 is a side cross sectional diagram for illustrating the circuit configuration of each mirror element. FIG. 12 shows an OFF capacitor 232a connected to the OFF electrode 231, and the OFF capacitor 232a connected via a gate transistor 233a to a bit line 234a and a word line 235. An ON capacitor 232b is connected to the ON electrode 236, and the ON capacitor 232b is connected via a gate transistor 233b to a bit line 234b and a word line 235 by way of a gate transistor 233b. Specifically, the OFF capacitor 232a and gate transistor 233a constitute a memory cell having a Dynamic Random Access Memory (DRAM) structure, as does the ON capacitor 232b and gate transistor 233b.

The turning on and off of the gate transistor 233a and gate transistor 233b are controlled via the word line 235.

Specifically, the mirror elements lined up on one horizontal row in line with an arbitrary word line 235 are simultaneously selected, and the charging, and discharging, of the charge in the OFF capacitor 232a and ON capacitor 232b are controlled via the bit lines 234a and 234b, respectively. Thereby, the ON, OFF, and oscillation of the mirror 237 of an individual mirror element on one horizontal row is controlled.

Figure 13A:
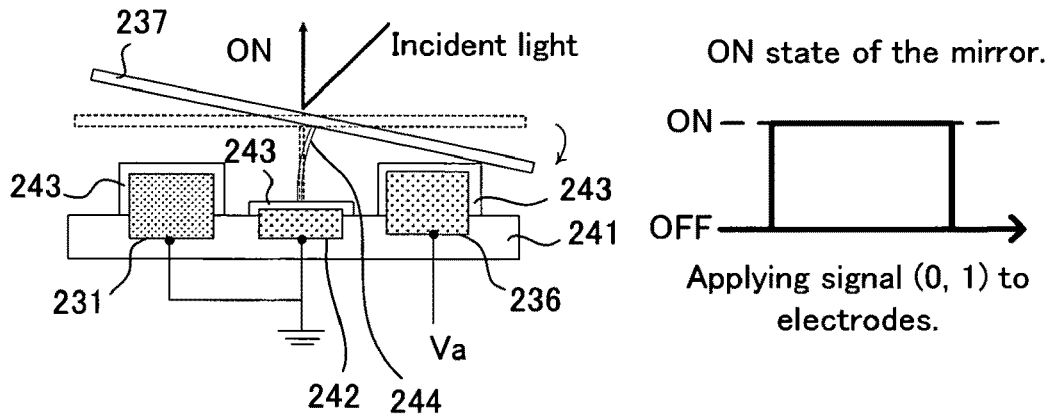
FIG. 13A is a diagram describing the ON control for a mirror.
Figure 13B:
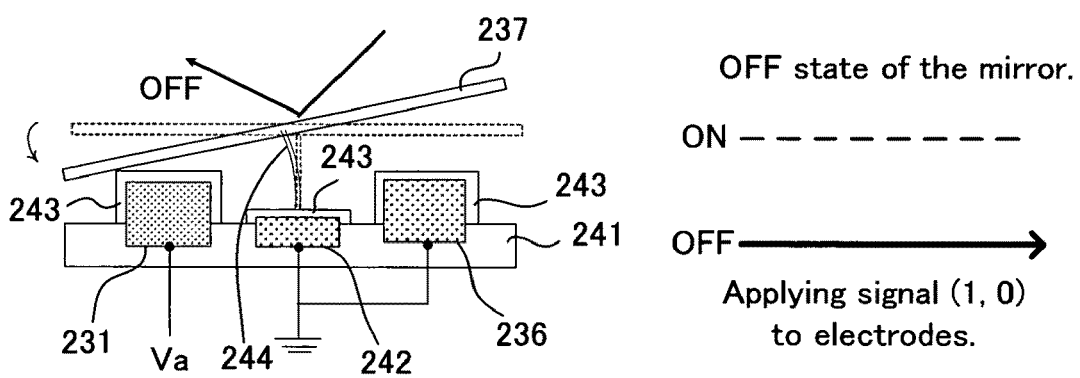
FIG. 13B is a diagram describing the OFF control for a mirror.
Figure 13C:
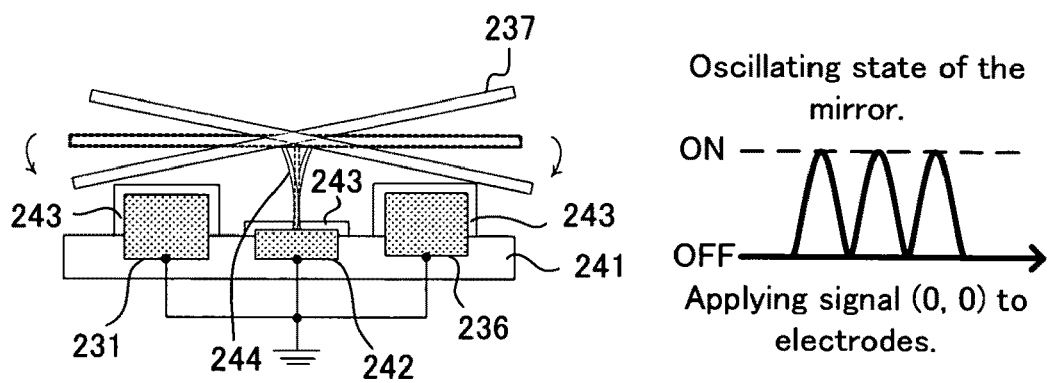
FIG. 13C is a diagram describing the oscillation control for a mirror.

A description of the control for the mirror 237 under the ON, OFF, and oscillation is provided in detail with reference to FIGS. 13A through 13C.

FIG. 13A is a side cross sectional diagram and an associated timing diagram for showing the state of the mirror 237 controlled to operate in an ON state. FIG. 13B is a side cross sectional diagram and an associated timing diagram for showing the state of the mirror 237 controlled to operate in an OFF state. FIG. 13C is a side cross sectional diagram and an associated timing diagram for showing the state of the mirror 237 controlled to operate in oscillation state). In each drawing, a cross-section of the mirror element in each state is shown on the left side of the figure, and the operation waveform (i.e., the control waveform) of the mirror 237 in each state is shown on the right side of the figure. The operation waveform of the mirror 237 in each state also corresponds to the output state of light to the projection light path reflected by the mirror 237 in each respective state.

As shown in FIGS. 13A through 13C, each mirror element is supported on an elastic hinge 244 extended from an electrode 242. Each mirror element further includes the above described OFF electrode 231 and ON electrode 236 on a substrate 241, with each electrode covered with an insulation layer 243. Note that the OFF electrode 231 and ON electrode 236 are also implemented as address electrodes. An elastic hinge 244 is connected to the hinge electrode 242, penetrating the insulation layer 243, and the elastic hinge 244 supports the deflectable mirror 237. The hinge electrode 242 is grounded.

When a signal (0, 1) is applied to the memory cell (not shown in the drawing here) of the mirror element the mirror 237 in the mirror element is controlled to operate in an ON state as shown in FIG. 13A. A signal (0, 1) causes a voltage Va [V] applied to the ON electrode 236 and a voltage 0 [V] applied to the OFF electrode 231. As the voltage Va [V] is applied to the ON electrode 236, the mirror 237 is drawn by a Coulomb force in the direction of the ON electrode 236. The mirror 237 is deflected to a position abutting the insulation layer 243 of the ON electrode 236 for reflecting the incident light towards a projection light path. The state of the mirror element and that of the mirror 237 in this event are referred to as an ON state, and the operation of the mirror element and that of the mirror 237 in such a manner is referred to as an ON operation.

When the mirror 237 is controlled to be OFF, a signal (1, 0) is given to the memory cell (not shown in the drawing here) of the mirror element, as shown in FIG. 13B. This causes a voltage Va [V] to be applied to the OFF electrode 231 and a voltage 0 [V] to be applied to the ON electrode 236. As a result, the mirror 237 is drawn by a Coulomb force in the direction of the OFF electrode 231, to which the voltage Va [V] is applied, and is tilted to a position abutting the insulation layer 243 of the OFF electrode 231. This causes the incident light to be reflected (i.e., deflected) by the mirror 237 in a direction other than the projection light path. The state of the mirror element and that of the mirror 237 in this event are referred to as the OFF state, and the operation of the mirror element and that of the mirror 237 in such a manner is referred to as an OFF operation.

As shown in FIG. 13C, when the mirror 237 is controlled to operate in an oscillation state, a signal (0, 0) is applied to the memory cell (not shown in the drawing here) of the mirror element when the mirror 237 is in the OFF state. This causes a voltage 0 [V] to be applied to both electrodes 231 and 236. As a result, the Coulomb force that has been generated between the mirror 237 and OFF electrode 231 is withdrawn, thus causing the mirror 237 to start a free oscillation, having an oscillation frequency depending on the elasticity of the elastic hinge 244. During the time when the mirror is operated in the oscillation state, the incident light is repeatedly reflected (i.e., deflected) by the mirror 237 between the ON direction and the OFF direction. The state of the mirror element and that of the mirror 237 in this event are referred to as the oscillation state, and the operation of the mirror element and that of the mirror 237 in such a manner is referred to as an oscillating operation.

Additionally, the mirror 237 can start to operate in an oscillation state when the mirror 237 is initially in the ON state.

FIG. 13C illustrates the mirror element operates in an oscillation state. The mirror alternately oscillates between directions of the ON state and OFF state. The oscillation amplitude of the mirror is the maximum amplitude. The mirror can also be set to have a smaller amplitude of oscillation. This is accomplished by applying a signal (0, 0) to a memory cell (not shown in the drawing here) of the mirror element just before the mirror 237 is tilted to a position abutting the insulation layer 243 of the ON electrode 236 or that of the OFF electrode 231, after starting the above described ON control or OFF control for the mirror 237. An alternate method is to apply a signal (1, 0) again to the memory cell for a desired period of time immediately after giving a signal (0, 0) to the memory cell (not shown in the drawing here) of the mirror element when the mirror 237 is in the OFF state.

The following is a description of an SLM control method carried out in the video image display apparatus that comprises an SLM control apparatus according to the present embodiment.

According to the present embodiment, the SLM controller 211 of the video image display apparatus controls SLM 101b in coordination with the light source control unit 213, which controls the laser light source 202 during the period in which the SLM controller 211 controls SLM 101a in accordance with the image data on the basis of a video image signal. Specifically, the SLM controller 211 maintains the operational state of SLM 101b in a constant state during the period in which the SLM controller 211 controls SLM 101a in accordance with the image data on the basis of a video image signal and also in which the light source control unit 213 switches over the color of the laser light (i.e., an illumination light) incident to SLM 101b. The constant state maintained in SLM 101b in this case signifies that the operational state of each mirror element on the SLM 101b is maintained in the ON state, OFF state, or the oscillation state. For example, the operational state of a mirror element can be maintained by maintaining the data accumulated in the memory cell that comprises a DRAM structure, or by overwriting the memory cell with the same data of the last writing cycle in the circuit configuration shown in FIG. 12.

FIGS. 14A, 15A, 16A, 17A, 18A, 19A and 20A are diagrams showing exemplary timing diagrams for controlling the two SLMs 101 performed by the SLM controller 211 described above. Each figure shows an exemplary timing diagram for controlling a pixel as a representative pixel implementing control processes shown in FIGS. 14B, 15B, 16B, 17B, 18B, 19B and 20B).

In these exemplary control processes, an incident red laser light is modulated in accordance with the SLM control data used for SLM 101a (that is, the red-use SLM control data) sent from the SLM controller 211. Furthermore, one frame period is divided into two sub-frames so that the blue laser light incident during the one sub-frame is modulated by SLM 101b in accordance with the SLM control data used for the blue light. Furthermore, the green laser light incident during the other sub-frame period is modulated by SLM 101b in accordance with the SLM control data used for the green light.

In these figures, the transition period spans the period from which the modulation of SLM 101b is controlled on the basis of the blue-use SLM control data sent from the SLM controller 133 to a period in which the modulation of SLM 101b is controlled on the basis of the green-use SLM control data sent from the SLM controller 133.

The exemplary control processes shown in FIGS. 14A and 15A are applied to maintain the operational state of all mirror elements of SLM 101b in the ON state during the period when the SLM controller 211 controls SLM 101a in accordance with the image data on the basis of a video image signal. That is a period when the red laser light incident to the SLM 101a is modulated in accordance with the SLM control data used for SLM 101a) and also when the light source control unit 213 switches the laser lights incident to the SLM 101b from the blue light to green light (i.e., the period $T_3$ in the example of FIG. 14A; and the period $T_4$ in the example of FIG. 15A). Specifically, the present embodiment implements a laser light source as the light source, and therefore, the period $T_3$ shown in FIG. 14A and the period $T_4$ shown in FIG. 15A are very short periods. In both of these transition periods, the intensity of projection light from SLM 101b is held constant at the maximum intensity during the period in which the laser lights are controlled to switch from the blue light to the green light.

Note that such control processes applied to the two SLMs 101 can be applied not only to the video image display apparatus according to the present embodiment implemented with a laser light source but also to, a video image display apparatus implemented with a lamp light source and a color wheel.

FIGS. 14B and 15B are diagrams showing the exemplary controls for SLM 101b in such a case. Note that the exemplary control for SLM 101a in this case is the same that as shown in FIGS. 14A and 15A, and therefore the drawing is not provided.

As shown in FIGS. 14B and 15B, the exemplary control in this case is such that the operational state of all mirror elements of SLM 101b is maintained in the ON state during the period in which the SLM controller 133 controls SLM 101a in accordance with the image data on the basis of a video image signal (i.e., the period in which the red light incident to SLM 101a is modulated in accordance with the SLM control data used for SLM 101a) and also in which the color wheel 115 switches over the light incident to SLM 101b from the blue light to the green light (i.e., the blanking period $T_5$ shown in FIG. 14B and the blanking period $T_6$ shown in FIG. 15B). In both of these periods, $T_5$ and $T_6$, the intensity of projection light from SLM 101b is held constant at the maximum intensity during the period in which the light is controlled to switch over from the blue light to the green light.

Figure 18A:
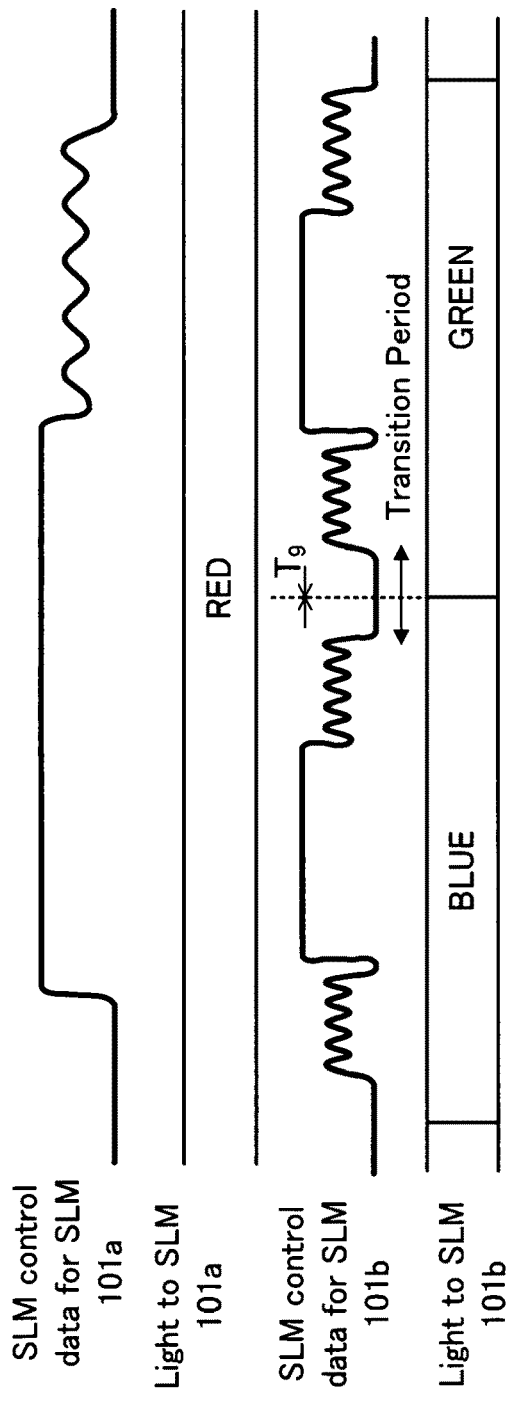
FIG. 18A is a fifth diagram showing an exemplary control for two SLMs performed by an SLM controller

In the exemplary controls shown in FIGS. 16A, 17A, 18A and 19A, the control is such that the operational state of all mirror elements of SLM 101b is maintained in the OFF state during the period in which the SLM controller 212 controls the SLM 101a in accordance with the image data on the basis of a video image data (i.e., the period in which the red laser light incident to SLM 101a is modulated in accordance with the SLM control data used for SLM 101a) and also in which the light source control unit 213 switches over the laser light incident to SLM 101b from the blue light to the green light (i.e., period $T_7$ in FIG. 16A; period $T_8$ in FIG. 17A; period $T_9$ in FIG. 18A; and period $T_{10}$ in FIG. 19A).

Note that the present embodiment is configured to use a laser light source as the light source, and therefore the above-described periods $T_7$, $T_8$, $T_9$, and $T_{10}$ are all very short periods. During these periods, the intensity of projection light from SLM 101b is held constant at "0" during the period in which the laser lights are switched from the blue light to the green light.

The above-described control method applied to the two SLMs 101 of the video image display apparatus according to the present embodiment comprising a laser light source can also be applied to a video image display apparatus according to the first embodiment implemented with a lamp light source and a color wheel.

FIGS. 16B, 17B, 18B and 19B are timing diagrams for showing an exemplary control process applied to the SLM 101b. Note that the exemplary control methods applied to the SLM 101a in these cases are the same as those shown in FIGS. 16A, 17A, 18A and 19A, and therefore the drawings are not provided here.

Figure 18B:
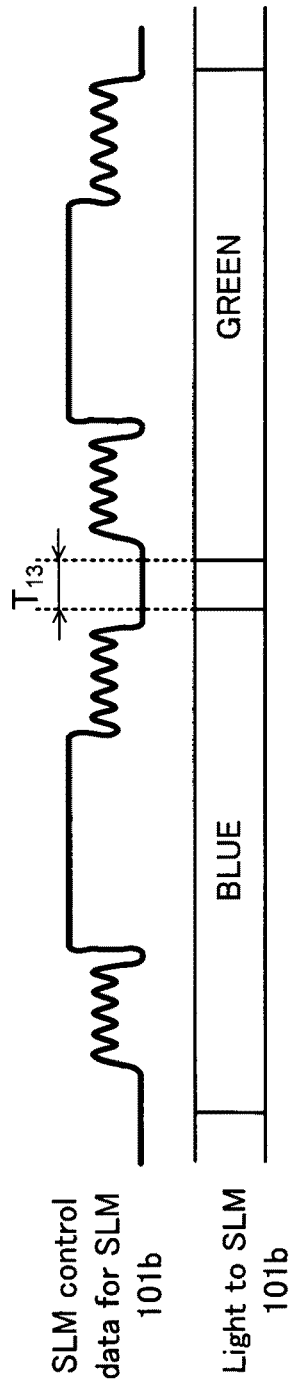
FIG. 18B is a fifth diagram showing an exemplary control for two SLMs performed by an SLM controller in a video image display apparatus comprising a lamp light source and a color wheel.

FIGS. 16B, 17B, 18B and 19B show the exemplary control methods with the operational state of all mirror elements of the SLM 101b maintained in the OFF state during the period when the SLM controller 133 controls SLM 101a in accordance with the image data on the basis of a video image signal (i.e., the period in which the red light incident to SLM 101a is modulated in accordance with the SLM control data used for SLM 101a) and also in which the color wheel 115 switches the light incident to SLM 101b from the blue light to the green light (i.e., the blanking periods $T_{11}$ in FIG. 16B, $T_{12}$ in FIG. 17B, $T_{13}$ in FIG. 18B, and $T_{14}$ in FIG. 19B). During the above-noted blanking periods $T_{11}$, $T_{12}$, $T_{13}$ and $T_{14}$, the intensity of projection light from the SLM 101b is held constant at "0".

Figure 20A:
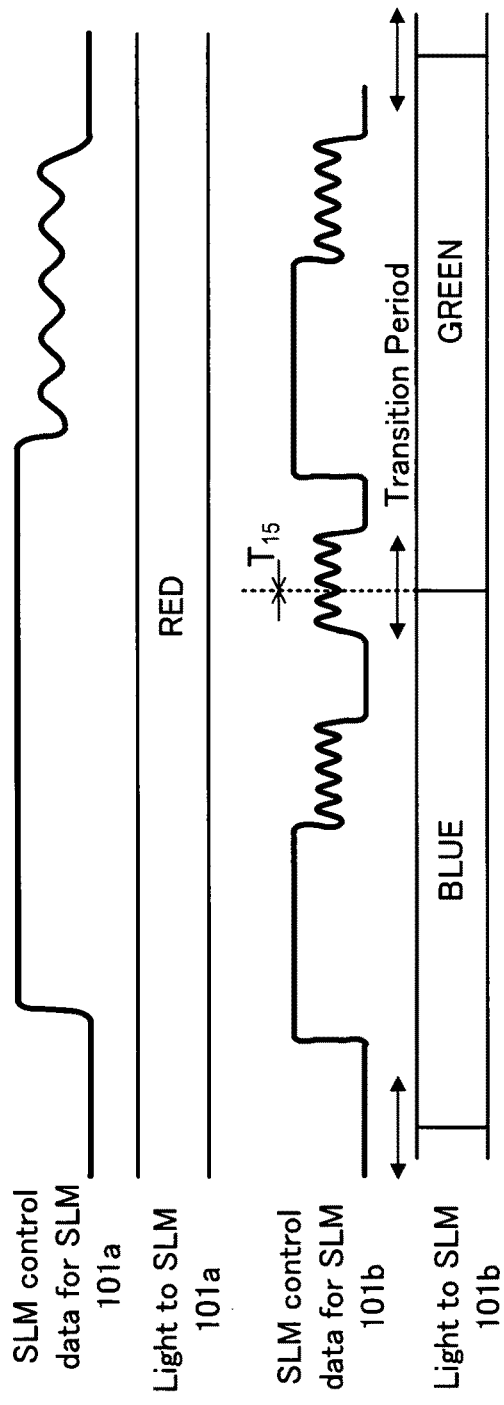
FIG. 20A is a seventh diagram showing an exemplary control for two SLMs performed by an SLM controller

In the exemplary control method shown in FIG. 20A, the operational state of all mirror elements of SLM 101b is maintained in the oscillation state during the period when the SLM controller 211 controls SLM 101a in accordance with the image data on the basis of a video image data (i.e., the period in which the red laser light incident to SLM 101a is modulated in accordance with the SLM control data used for SLM 101a) and also in which the light source control unit 213 switches over the laser light incident to SLM 101b from the blue light to the green light (i.e., the period $T_{15}$ in the example of FIG. 20A). Note that the present embodiment is configured to use a laser light source as light source, and therefore the above described period $T_{15}$ shown in FIG. 20A is a very short period. During the above-noted period $T_{15}$, the intensity of projection light from the SLM 101b is held constant at an intermediate quantity (i.e., the intensity of light that is neither zero nor the maximum).

The above-described control methods applied to the two SLMs 101 of the video image display apparatus according to the present embodiment comprising a laser light source can also be applied to a video image display apparatus implemented with a lamp light source and a color wheel.

Figure 20B:
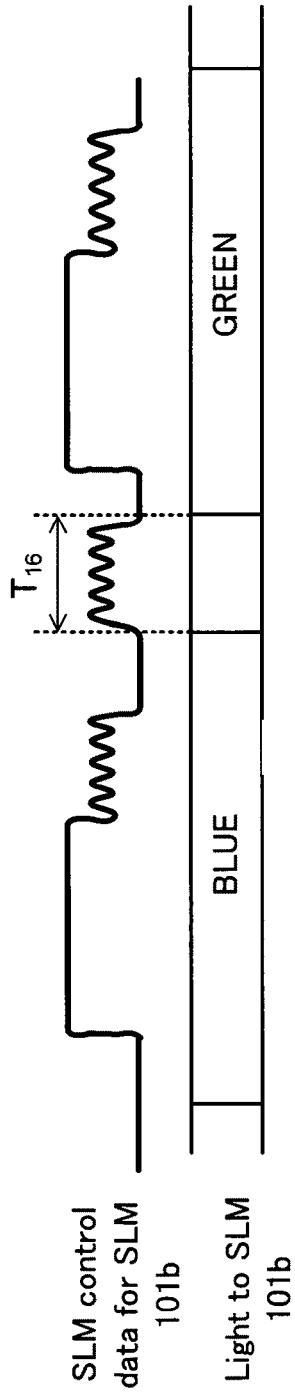
FIG. 20B is a seventh diagram showing an exemplary control for two SLMs performed by an SLM controller in a video image display apparatus comprising a lamp light source and a color wheel.

FIG. 20B is a timing diagram for showing an exemplary control method applied to the SLM 101b. The control process applied to the SLM 101a is the same as that shown in FIG. 20A, and the drawing is not provided here.

FIG. 20B illustrates a control process with the operational state of all mirror elements of SLM 101b maintained in the oscillation state during the period when the SLM controller 133 controls SLM 101a in accordance with the image data on the basis of a video image signal (i.e., the period in which the red light incident to SLM 101a is modulated in accordance with the SLM control data used for SLM 101a) and also in which the color wheel 115 switches over the light incident to SLM 101b from the blue light to the green light (i.e., the blanking period $T_{16}$ shown in FIG. 20B). Also, during the blanking period $T_{16}$, the intensity of projection light from SLM 101b is held constant at an intermediate intensity (i.e., the intensity of light that is neither zero nor the maximum).

As described above, the video image display apparatus according to the present embodiment is capable holding constant the intensity of projection light at various levels during the period when the color of incident light is switched over in a time sequence, thereby making it possible to prevent a degradation in the video image quality due to a temporary decrease in the intensity of projection light during the switching period. Further, if the intensity of projection light is adjusted in accordance with the level of brightness of the video scene to be displayed, when the SLM is controlled so that the intensity of projection light is held constant during the switching period. The above-described control methods can further prevent a degradation in the video image quality.

Third Embodiment

A third preferred embodiment of the present invention comprises a video image display apparatus implemented with an SLM control apparatus comprising the same optical components as those of the above described video image display apparatus according to the second embodiment. The video image display apparatus implements a different control method for operating the video image display apparatus with different operational sequences.

In the video image display apparatus according to the present embodiment, the SLM controller 211 applies the image data read received from the frame buffer 132 to generate a piece of control data for SLM 101a for each sub-frame of multiple sub-frame periods obtained by dividing one frame period, and also generates a piece of control data for SLM 101b for each sub-frame of multiple sub-frame periods obtained by dividing one frame period. Here, one sub-frame period related to the control data for SLM 101a and one sub-frame period related to the control data for SLM 101b may be the same, or the two periods may be different from each other. If the configuration is such that one sub-frame period for SLM 101a and one sub-frame period for SLM 101b are the same, the start timing of the sub-frame period for SLM 101a may be set to be different from the start timing of the sub-frame period for SLM 101b. Furthermore, when the display of SLM 101b is started for an area where the display is carried out using SLM 101a, the area of the SLM 101b corresponding to the display area of the SLM 101a can also be selected for starting the image display applying mirror elements in the selected area. Alternately, the start timing of display for SLM 101b may be matched to that of SLM 101a. A discretionary word line of the SLM can be selected, as described above, and therefore the designation of the same address for selecting the respective word lines of SLM 101a and SLM 101b eliminates a need to provide a specific circuit, enabling the implementation of the circuit disclosed in this application. This configuration makes it possible to reduce the occurrence of a shift in displays between SLM 101a and SLM 101b.

Furthermore, the data of SLM 101a and that of SLM 101b may be controlled to have different gradations and/or gamma characteristics.

Associated with the above-described methods, the light source control unit 213 controls the light source drive circuit 214 to control the illumination lights incident to SLM 101a and SLM 101b for each sub-frame period related to the control data for SLM 101a and SLM 101b, respectively. Since only the red laser light is incident to SLM 101b the light source may be continuously turned on regardless of the sub-frame period related to the SLM 101b. Specifically, the sequencer 212 controls the above-described operational timings.

Figure 21:
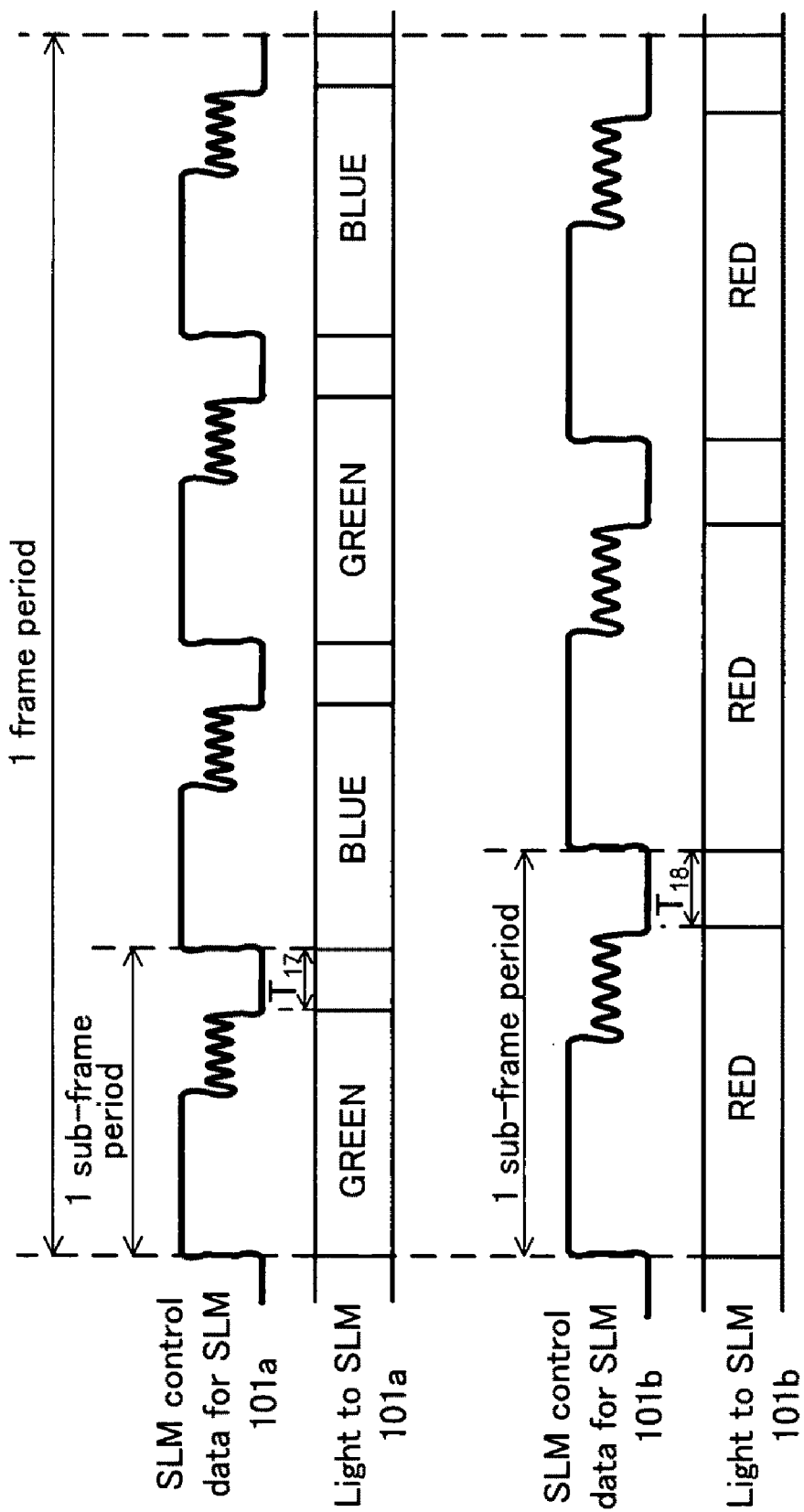
FIG. 21 is a first diagram showing an exemplary control for two SLMs and laser lights to be incident to the two SLMs.
Figure 22:
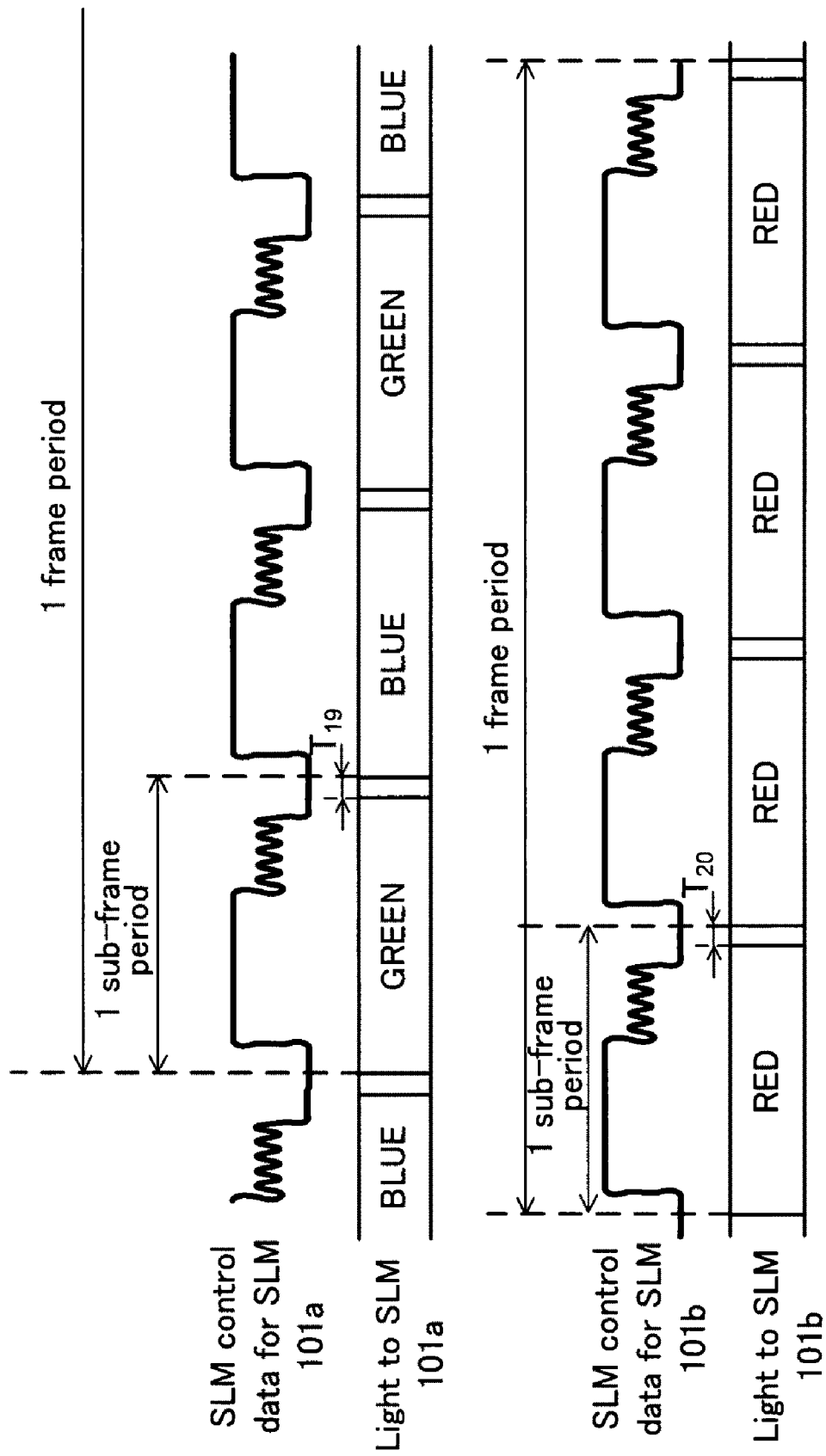
FIG. 22 is a second diagram showing an exemplary control for two SLMs and laser lights to be incident to the two SLMs.
Figure 23:
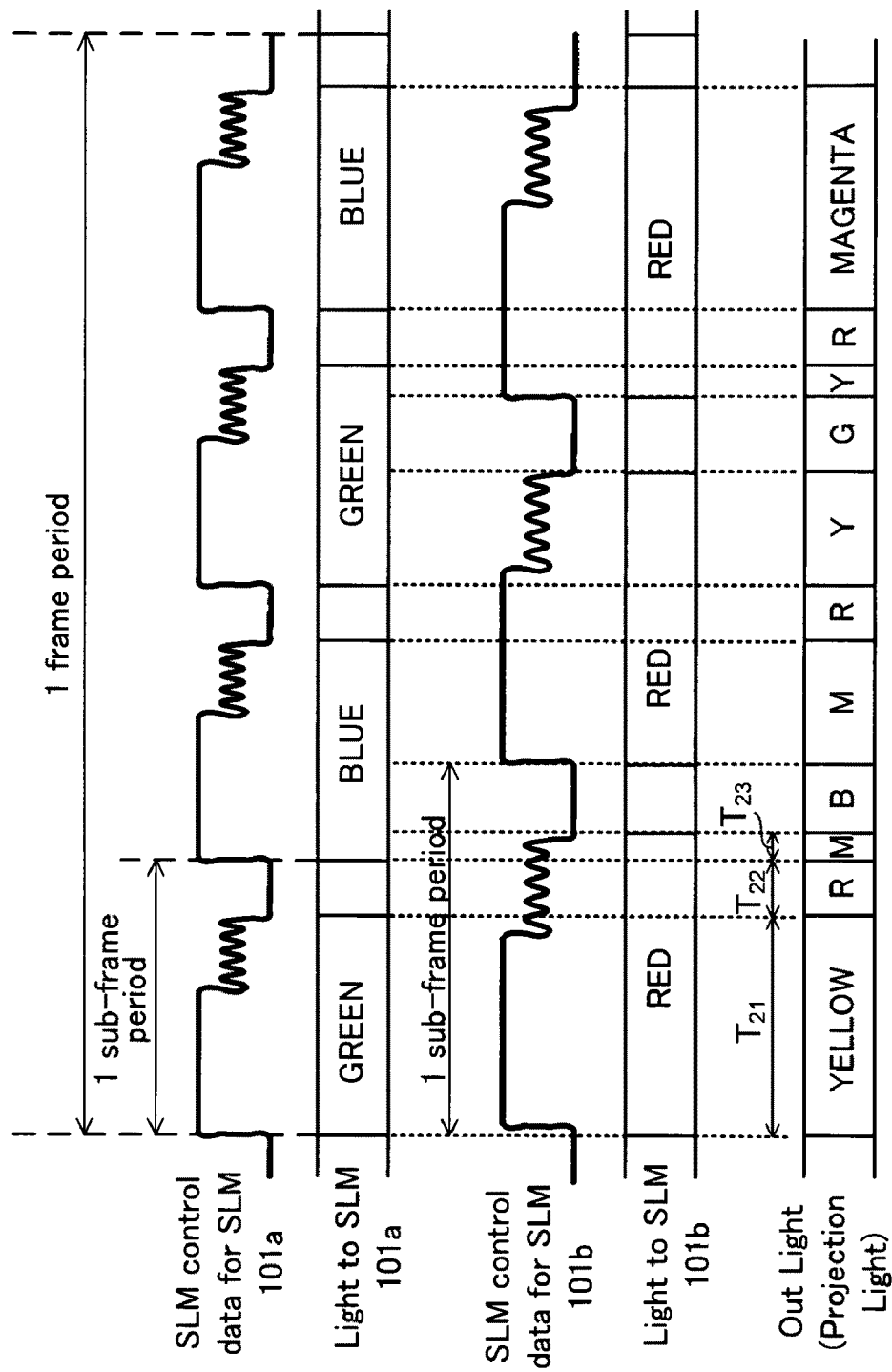
FIG. 23 is a first diagram showing an exemplary control for two SLMs and laser lights to be incident to the two SLMs and also showing the colors of output lights (i.e., projection lights) that are projected onto a screen by the two SLMs.
Figure 24:
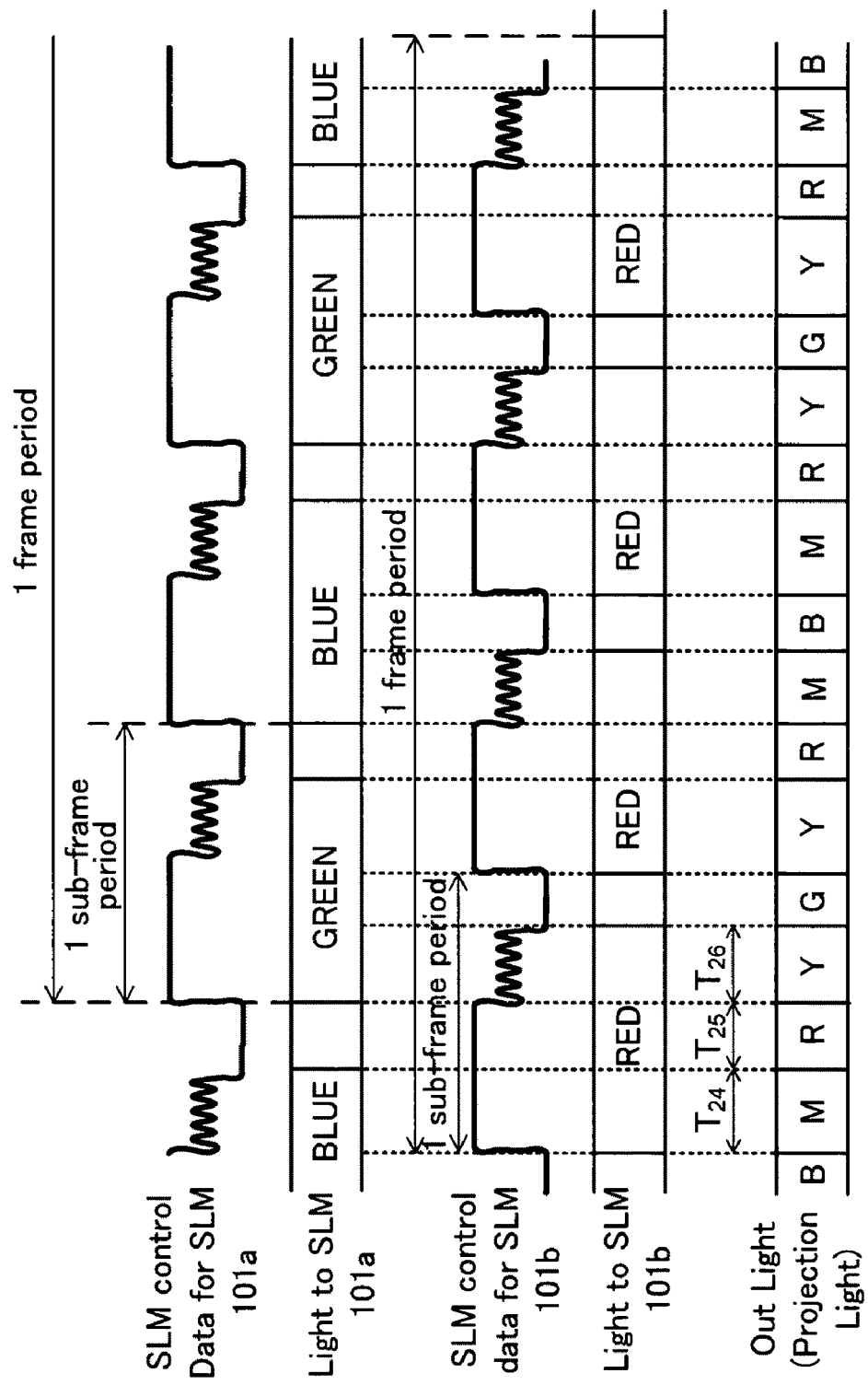
FIG. 24 is a second diagram showing an exemplary control for two SLMs and laser lights to be incident to the two SLMs and also showing the colors of output lights (i.e., projection lights) that are projected onto a screen by the two SLMs.

FIGS. 21 and 22 are timing diagrams for showing the operational sequences of two SLMs 101 and an exemplary control process for laser lights incident to the two SLMs 101. Furthermore, FIGS. 23 and 24 are timing diagrams for showing the operational sequences of two SLMs 101 and an exemplary control process for laser lights incident to the two SLMs 101 and also the colors of output lights (i.e., projection lights) that are projected onto a screen by the two SLMs 101. Specifically, each figure shows an exemplary control process of a representative pixel.

Specifically, for the convenience of description, FIGS. 21 through 24 depict the period of switching over the colors of laser lights incident to the SLM 101a (e.g., the period $T_{17}$ shown in FIG. 21) and the period between the end of the irradiation of laser light to the SLM 101b in one sub-frame period and the start of the irradiation in the next sub-frame (e.g., the period $T_{18}$ shown in FIG. 21) as a longer period; they are, however, very short periods. Further, for the convenience of description, FIGS. 22 and 24 depict the shift between the start timing of one frame period related to the control data for SLM 101a and the start timing of one frame period related to the control data for SLM 101b as relatively large; it is, however, actually very small, to the extent that it is unrecognizable to a viewer.

The exemplary control process shown in FIG. 21 is implemented in a video image display apparatus wherein the SLM controller 211 generates control data for SLM 101a for each sub-frame period of four sub-frames, obtained by dividing one frame period into four parts; generates control data for SLM 101b for each sub-frame period of three sub-frame periods, obtained by dividing one frame period into three parts; and controls the two SLMs 101. The light source control unit 213 controls the illumination lights incident to SLM 101a and SLM 101b for each sub-frame period related to the control data for SLM 101a and SLM 101b, respectively. In this exemplary control process, the sub-frame period related to the control data for SLM 101a is different from the sub-frame period related to the control data for SLM 101b.

By applying the above-described control process, FIG. 21 shows that the timing of the period (e.g., the period $T_{17}$) when the colors of laser lights incident to the SLM 101a are switched is different from the timing of the period (e.g., the period $T_{18}$) between the end of the irradiation of laser light onto SLM 101b in one frame period and the start of the irradiation of laser light onto SLM 101b in the next sub-frame period. Thereby, the control processes suppress the phenomena of color breakup.

FIG. 22 shows another exemplary control process. Specifically, the SLM controller 211 generates control data for SLM 101a for each sub-frame period of four sub-frames subdivided from one frame period. The SLM controller 211 further generates control data for SLM 101b for each sub-frame period of the four sub-frame periods subdivided from one frame period. The SLM controller 211 further controls two SLMs 101. The light source control unit 213 controls the illumination lights incident to SLM 101a and SLM 101b for each sub-frame period related to the control data for SLM 101a and SLM 101b, respectively. In this exemplary control process, however, one sub-frame period for applying the control data to SLM 101a is the same as one sub-frame period for applying the control data to SLM 101b. Therefore, the start timing of one sub-frame period for applying the control data to the SLM 101a is different from the start timing of one sub-frame period for applying the control data to the SLM 101b.

According to the above-described control process, FIG. 22 illustrates that the timing of the period (e.g., the period $T_{19}$) when the colors of laser lights incident to the SLM 101a are switched over is always different from the timing of the period (e.g., the period $T_{20}$) between the end of the irradiation of laser light onto SLM 101b in one frame period and the start of the irradiation of laser light onto SLM 101b in the next one sub-frame period. Thereby, the control processes as described suppress the color breakup phenomena.

The exemplary control process shown in FIG. 23 is basically the same as the control process shown in FIG. 21. Specifically, the SLM controller 211 generates control data for SLM 101a for each sub-frame period of four sub-frames subdivided from one frame period. The SLM controller 211 further generates control data for SLM 101b for each sub-frame period of three sub-frame periods subdivided from one frame period. The SLM controller 211 further controls the two SLMs 101. The light source control unit 213 controls the illumination light incident to the SLM 101a and SLM 101b for each sub-frame period for applying the control data to SLM 101a and SLM 101b, respectively. In this exemplary control process, one sub-frame period for applying the control data to the SLM 101a is different from one sub-frame period related to the control data for SLM 101b.

As that illustrated in FIG. 21, the above-described control process can therefore suppress the color breakup phenomenon.

FIG. 23 illustrates another exemplary control process. An output light (i.e., the projection light) projected on the screen 121 by the two SLMs 101 may be either one of the complementary colors (i.e., yellow (Y) and magenta (M)) or the three primary colors (i.e., red (R), green (G) and blue (B)). Furthermore, a period any one of the three primary colors of light is projected in a period following the rule as set forth below: a) the period $T_{23}$ when the right of red (R) is projected between a period when the light of either of the complementary colors is being projected; b) the period $T_{21}$ when the light of yellow is projected and a period when the light of either of the complementary colors is projected, e.g., the period $T_{22}$ in which the light of magenta is projected).

Furthermore, the exemplary control process arranges the cycle of periods when projecting any one of the three primary colors of light, e.g., the cycle of periods when projecting the light of R is different from the cycle of periods when projecting another one or two color lights of the three primary colors (e.g., the cycle of periods when projecting the light of blue or green lights.

Furthermore, the exemplary control process arranges the period when projecting any one of the three primary color lights, (e.g., the periods when projecting the red light is different from the period when projecting the light(s) of another one or two color lights of three primary colors, e.g., the period when projecting the blue or green light.

FIG. 24 illustrates another exemplary control process that is basically the same as the control process shown in FIG. 22. Specifically, the SLM controller 211 generates control data for SLM 101a for each one sub-frame period of four sub-frames, subdivided from one frame period. The SLM controller further generates control data for the SLM 101b for each one sub-frame period of four sub-frame periods subdivided from one frame period. The light source control unit 213 controls the illumination light to be incident to SLM 101a and SLM 101b for each sub-frame period related to the control data for SLM 101a and SLM 101b, respectively. In this exemplary control process, however, one sub-frame period for applying the control data for SLM 101a is the same as one sub-frame period for applying the control data for SLM 101b, whereas the start timing of one sub-frame period for applying the control data for SLM 101a is different from the start timing of one sub-frame period for applying the control data to the SLM 101b. The above-described control process as illustrated in FIG. 22 can therefore further suppress the color breakup phenomena.

FIG. 24 illustrates another exemplary control process wherein the output light, i.e., the projection light, that may comprise either one of complementary colors (i.e., yellow (Y) and magenta (M)) and three primary colors of light (i.e., red (R), green (G) and blue (B)) is projected on the screen 121 by the two SLMs 101. Furthermore, the exemplary control process arrange a period for projecting any one of the three primary color lights by the following rules: a) projecting the red (R) light in the period $T_{26}$ between a period when projecting the light of either of the complementary colors, b) projecting the magenta (M) light in the period $T_{24}$ and a period when projecting either of the complementary colors, e.g., the period $T_{25}$ when projecting the yellow light.

Furthermore, the exemplary control arranges the cycle of periods for projecting any one of the three primary color lights, e.g., the cycle of periods for projecting the light of R is different from the cycle of periods for projecting the light(s) of another one or two colors of three primary colors, e.g., the cycle of periods for projecting the blue (B) light.

Furthermore, the exemplary control process arranges the period for projecting any one of the three primary colors of light, e.g., the periods for projecting the red light is different from the period for projecting the light(s) of another one or two colors of three primary colors, e.g., the period for projecting the green (G) light.

As described thus far, the video image display apparatus according to the present embodiment is configured to differentiate, in some or all cases, the timing of the period in which the colors of laser lights incident to SLM 101a are switched over from the timing of the period between the end of the irradiation of laser light onto SLM 101b in one sub-frame period and the start of the irradiation of the laser light onto SLM 101b in the next one sub-frame period. Thereby, the control processes can suppress the color breakup phenomena.

Specifically, the description of the present embodiment has been provided by exemplifying the image display device as the video image display apparatus according to the second embodiment as the video image display apparatus; it is understood that control processes and system configuration may also be utilized in different video display apparatuses including but not limited to the video image display apparatus according to the first embodiment.

While the present invention has been described in detail, the present invention, however, may of course be improved or modified in various manners possible within the spirit and scope of the present invention, and is not limited to the embodiments described above.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. A method for controlling a light source for projecting illumination lights of different wavelengths to a first spatial light modulator (SLM) and a second SLM of a video image display apparatus, the method further comprising:
controlling a time-sequence for changing the wavelengths of the illumination lights projecting to the first SLM wherein the time sequence is different from and not synchronized with another time sequence for changing the wavelengths of the illumination lights projecting to the second SLM.

2. The method according to claim 1, wherein:
the step of controlling the two different time sequences of changing the wavelengths of the illumination lights projecting to the first SLM and the second SLM further comprising a step of controlling the two different time sequences of changing wavelengths of three primary colors of the illumination lights projecting to the first SLM and the second SLM.

3. The method according to claim 1, wherein:
the step of projecting the illumination light from a light source further comprising a step of projecting the illumination lights from a semiconductor light source.

4. The method according to claim 1, wherein:
the step of projecting the illumination light to the first SLM and the second SLM further comprising a step of projecting the illumination lights to a first mirror device and second mirror device functioning as the first SLM and the second SLM respectively.

5. A method for controlling a light source projecting illumination lights of different wavelengths to a first spatial light modulator (SLM) and a second SLM of a video image display apparatus, the method further comprising:
controlling lengths of periods for projecting the illumination lights of different wavelengths to the first SLM wherein the lengths of periods are different and not synchronized with lengths of periods for projection the illumination lights of different wavelengths to the second SLM.

6. The method according to claim 5, wherein:
the step of projecting the illumination light from a light source further comprising a step of projecting the illumination lights from a semiconductor light source.

7. The method according to claim 5, wherein:
said step of controlling the lengths of periods for projecting the illumination lights of different wavelengths to the first SLM and the second SLM further comprising a step of controlling the light source for projecting wavelengths of primary colors to the first and second SLM in the different lengths of periods.

8. The method according to claim 5, wherein:
said step of controlling the lengths of periods for projecting the illumination lights of different wavelengths to the first SLM and the second SLM further comprising a step of controlling the light source for projecting the illumination lights in a fixed length of period to one of the first SLM and the second SLM and projecting the illumination lights in a variable lengths of periods different from the fixed length of period to another one of the first SLM and the second SLM.

9. The method according to claim 5, wherein:
said step of controlling the lengths of periods for projecting the illumination lights of different wavelengths to the first SLM and the second SLM further comprising a step of controlling the light source for projecting the illumination lights of one of the different wavelengths to one of the first SLM and the second SLM in a period shorter than a period for projecting the illumination light of the same wavelength to another one of the first SLM and the second SLM.

10. The method according to claim 5, wherein:
said step of controlling the lengths of periods for projecting the illumination lights of different wavelengths to the first SLM and the second SLM further comprising a step of controlling the light source for for projecting the illumination light of one of the wavelengths longer than a period for projecting the illumination light of another one of the wavelengths to the first SLM and the second SLM.

11. A video image display apparatus for displaying a video image in accordance with a video image signal, comprising:
a light source for emitting illumination lights of at least three primary colors to a first spatial light modulator (SLM) and a second SLM;
a light source control unit for controlling the light source for projecting the illumination lights of the three primary colors in two different unsynchronized time sequences and to the first SLM and second SLM; and
a synthesis unit for synthesizing modulated lights from the first SLM and the second SLM to generate one of the three primary colors and a synthesized complimentary color generated from the primary colors enabled by said light source projecting the illumination lights of the three primary colors in two different unsynchronized time sequences to the first SLM and the second SLM.

12. The video image display apparatus according to claim 11, wherein:
the light source further comprises a semiconductor light source.

13. The video image display apparatus according to claim 11 wherein:
the light source control unit controls the light source to project the illumination lights of the three primary colors in said two different unsynchronized time sequences to the first SLM and the second SLM for generating and projecting the modulated lights to the synthesis unit for generating synthesized lights to alternate between one of the primary colors and one of the complementary colors.

14. The video image display apparatus according to claim 11, wherein:
at least one of the first SLM and the second SLM comprises a mirror device.

15. The video image display apparatus according to claim 14, wherein:
the light source projects the lights along a same direction to the first SLM and the second SLM.

16. The video image display apparatus according to claim 14, wherein:
the light source projects the lights along a same incident angle to the first SLM and the second SLM.

17. The video image display apparatus according to claim 11, wherein:
the synthesis unit further comprises a Philips prism.

18. The video image display apparatus according to claim 11, wherein:
the synthesis unit further comprises a Kester prism.

19. The video image display apparatus according to claim 11, wherein:
the synthesis unit comprises a dichroic mirror.

20. The video image display apparatus according to claim 11, wherein:
the synthesis unit comprises a cross prism.

21. The video image display apparatus according to claim 11, wherein:
the synthesis unit comprises a polarization beam splitter (PBS).

* * * * *